US011936052B2

(12) United States Patent
Kim et al.

(10) Patent No.: US 11,936,052 B2
(45) Date of Patent: Mar. 19, 2024

(54) FLUORINE-DOPED TIN OXIDE SUPPORT AND PT CATALYST FOR FUEL CELL COMPRISING THE SAME

(71) Applicant: KOREA INSTITUTE OF SCIENCE AND TECHNOLOGY, Seoul (KR)

(72) Inventors: Jin Young Kim, Seoul (KR); Jong Min Kim, Seoul (KR); Hee-Young Park, Seoul (KR); So Young Lee, Seoul (KR); Hyun Seo Park, Seoul (KR); Sung Jong Yoo, Seoul (KR); Jong Hyun Jang, Seoul (KR); Hyoung-Juhn Kim, Seoul (KR); Chang Won Yoon, Seoul (KR); Jonghee Han, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 181 days.

(21) Appl. No.: 16/850,750

(22) Filed: Apr. 16, 2020

(65) Prior Publication Data
US 2020/0335800 A1  Oct. 22, 2020

(30) Foreign Application Priority Data
Apr. 19, 2019  (KR) .................... 10-2019-0046329

(51) Int. Cl.
*H01M 4/92* (2006.01)
*C01G 19/02* (2006.01)
(Continued)

(52) U.S. Cl.
CPC ............ *H01M 4/925* (2013.01); *C01G 19/02* (2013.01); *D01F 9/08* (2013.01); *H01M 4/8673* (2013.01);
(Continued)

(58) Field of Classification Search
CPC .. B01J 6/008; B01J 8/00; B82Y 40/00; C01G 19/02; D01F 9/08; C01P 2004/13; D01D 5/0007
(Continued)

(56) References Cited

U.S. PATENT DOCUMENTS

| 8,445,164 B2 | 5/2013 | Ji et al. |
| 2012/0295184 A1 | 11/2012 | Watanabe et al. |
| 2014/0349203 A1 | 11/2014 | Klose-Schubert et al. |

FOREIGN PATENT DOCUMENTS

| CN | 103924381 A | * | 7/2014 | |
| EP | 2765223 B1 | * | 7/2017 | ............ B01J 23/462 |

(Continued)

OTHER PUBLICATIONS

Machine translation of CN 103924381 A originally published Jul. 2014 to Zhu et al. (Year: 2014).*
(Continued)

*Primary Examiner* — Coris Fung
*Assistant Examiner* — Ritu S Shirali
(74) *Attorney, Agent, or Firm* — Birch, Stewart, Kolasch & Birch, LLP

(57) ABSTRACT

Provided is a fluorine-doped tin oxide support, a platinum catalyst for a fuel cell having the same, and a method for producing the same. Also described is a high electrical conductivity and electrochemical durability by doping fluorine to the tin oxide-based support through an electrospinning process. Thus, while resolving a degradation issue of the carbon support in the conventional commercially available platinum/carbon (Pt/C) catalyst, what is designed is to minimize an electrochemical elution of dopant or tin, which is a limitation of the tin oxide support itself and has excellent performance as a catalyst for a fuel cell.

6 Claims, 21 Drawing Sheets

(51) Int. Cl.
*D01D 5/00* (2006.01)
*D01F 9/08* (2006.01)
*H01M 4/86* (2006.01)

(52) U.S. Cl.
CPC ...... *C01P 2002/54* (2013.01); *C01P 2004/13* (2013.01); *D01D 5/0007* (2013.01)

(58) Field of Classification Search
USPC ........................................................ 423/618
See application file for complete search history.

(56) References Cited

FOREIGN PATENT DOCUMENTS

| | | |
|---|---|---|
| EP | 3 235 790 A1 | 10/2017 |
| JP | 2014-39910 A | 3/2014 |
| KR | 10-1035003 B1 | 5/2011 |
| KR | 10-2012-0107081 A | 9/2012 |
| KR | 10-1395762 B1 | 5/2014 |
| KR | 10-2014-0116056 A | 10/2014 |
| KR | 10-1664235 B1 | 10/2016 |
| KR | 10-2017-0088841 A | 8/2017 |
| KR | 10-1816800 B1 | 1/2018 |
| KR | 10-1969547 B1 | 4/2019 |

OTHER PUBLICATIONS

Cheng et al., Nickel-doped tin oxide hollow nanofibers prepared by electrospinning for acetone sensing, Sep. 2013, Sensors and Actuators B, vol. 190, pp. 78-85 (Year: 2013).*
Kato et al., Cathodic Arc-plasma Deposition of Platinum Nanoparticles of Fluorine-doped Tin Oxide for Electrocatalytic Nitrate Reduction Reaction, 2018, Electrochemistry, vol. 86, pp. 220-222 (Year: 2018).*
Machine translation of EP 2765223 B1 originally published Jul. 2017 to Andreas et al. (Year: 2017).*
Adedokun, Effect of Fluorine Doping On the Structural, Optical, and Electrical Properties of Spin Coated Tin Oxide Thin Films For Solar Cells Applications, 2018, Science Focus: Special Edition, vol. 23(2), pp. 15-21 (Year: 2018).*
Samad et al., "Effect of Metals Compatibility on Fluorine-Doped Tin Oxide Catalyst for Glycerol Conversion to 1,2-Propanediol," Materials Science Forum, vol. 888, 2017, pp. 496-502.
Samad et al., "Fluorine-doped tin oxide catalyst for glycerol conversion to methanol in sub-critical water," The Journal of Supercritical Fluids, vol. 120, Part 2, 2016, pp. 366-378.

* cited by examiner

FLUORINE-DOPED TIN OXIDE SUPPORT AND PT CATALYST FOR FUEL CELL COMPRISING THE SAME

DESCRIPTION OF GOVERNMENT-SPONSORED RESEARCH AND DEVELOPMENT

This research is sponsored by Ministry of Trade, Industry and Energy (Project Title: Development of air-cooled passive type ultra-light fuel cell non-humidified MEA for drones, Project Serial No.: 1415160944) and Ministry of Science and ICT (Project Title: Electrode structure control based on catalyst support and development of catalyst layer for high power and high durability polymer fuel cell therethrough; Project Serial No.: 1711077068) under the management of Korea Institute of Science and Technology.

CROSS-REFERENCE TO RELATED APPLICATION

This application claims priority to and the benefit of Korean Patent Application No. 2019-0046329, filed on Apr. 19, 2019, the disclosure of which is incorporated herein by reference in its entirety.

BACKGROUND OF THE INVENTION

Field of the Invention

Description of the Related Art

The present specification describes a support for a platinum catalyst for a fuel cell and a method of producing the same.

Commercially available catalysts currently widely used in polymer electrolyte membrane fuel cells (PEMFCs) are platinum/carbon (Pt/C) catalysts with 2-5 nm of platinum particles evenly supported on a carbon support (carbon black). There is an advantage in that carbon black provides a large surface area and excellent electrical conductivity. However, there is a problem in that catalyst layer degradation occurs due to electrochemical corrosion of a carbon support during an actual fuel cell driving process. This soon leads to serious degradation of fuel cell performance, and this problem is more prominent in harsh conditions that require more than 20,000 hours of driving time such as taxis or buses.

Accordingly, developing a catalyst having higher activity and durability than commercially available platinum/carbon (Pt/C) catalysts has recently emerged as a task of commercializing polymer electrolyte membrane fuel cells. In order to fundamentally solve the problem of electrochemical corrosion of a carbon support, high crystalline carbon materials having excellent electrochemical corrosion resistance, for example, carbon nanotubes, graphene, and high crystalline carbon black, were used as substitutes. However, in the case of high crystalline carbon materials, due to its high price and stable surface, there are a few sites where platinum particles can be generated, and thus there is a limitation in that the supporting efficiency of platinum, which is advantageous for fuel cell performance, is low. In addition, although high crystalline carbon materials are more resistant to corrosion than amorphous carbon materials, in the environment where high voltage is applied such as start-up/shut-down, high crystalline carbon materials also cause electrochemical corrosion issues, just like amorphous carbon materials. Accordingly, recently, oxide-based nanomaterials having excellent electrochemical durability apart from carbon-based materials have attracted much spotlight as a candidate group capable of presenting a solution, and among them, tin oxide-based nanomaterials have attracted much attention. However, the tin oxide-based material itself must comprise a doping element because of its low electrical conductivity for use as a support of an electrochemical catalyst. In this case, an elution issue of the doping element occurs during a fuel cell driving process, thus leading to deterioration of fuel cell performance.

SUMMARY OF THE INVENTION

In one aspect, the present disclosure is directed to providing a tin oxide-based support having a high electrical conductivity and electrochemical durability, and a platinum catalyst for a fuel cell and a production method thereof.

In one aspect, the present disclosure is directed to providing a fluorine-doped tin oxide support.

In another aspect, the present disclosure is directed to providing a platinum catalyst for a fuel cell comprising a platinum nanoparticle, and a tin-based oxide support doped with fluorine.

In another aspect, the present disclosure is directed to providing an oxidation reduction electrode for a fuel cell comprising the platinum catalyst.

In another aspect, the present disclosure is directed to providing a fuel cell comprising the platinum catalyst.

In another aspect, the present disclosure is directed to providing a method for producing a fluorine-doped tin oxide nanotube support, comprising electrospinning a solution comprising a tin precursor and a fluorine precursor to produce a tin oxide nanofiber doped with fluorine, and heat-treating the nanofiber to produce a nanotube.

In another aspect, the present disclosure is directed to providing a method for producing a platinum catalyst for a fuel cell comprising producing a fluorine-doped tin oxide support, and supporting a platinum nanoparticle on the fluorine-doped tin oxide support.

DETAILED DESCRIPTION OF THE PREFERRED EMBODIMENTS

Figure 1:
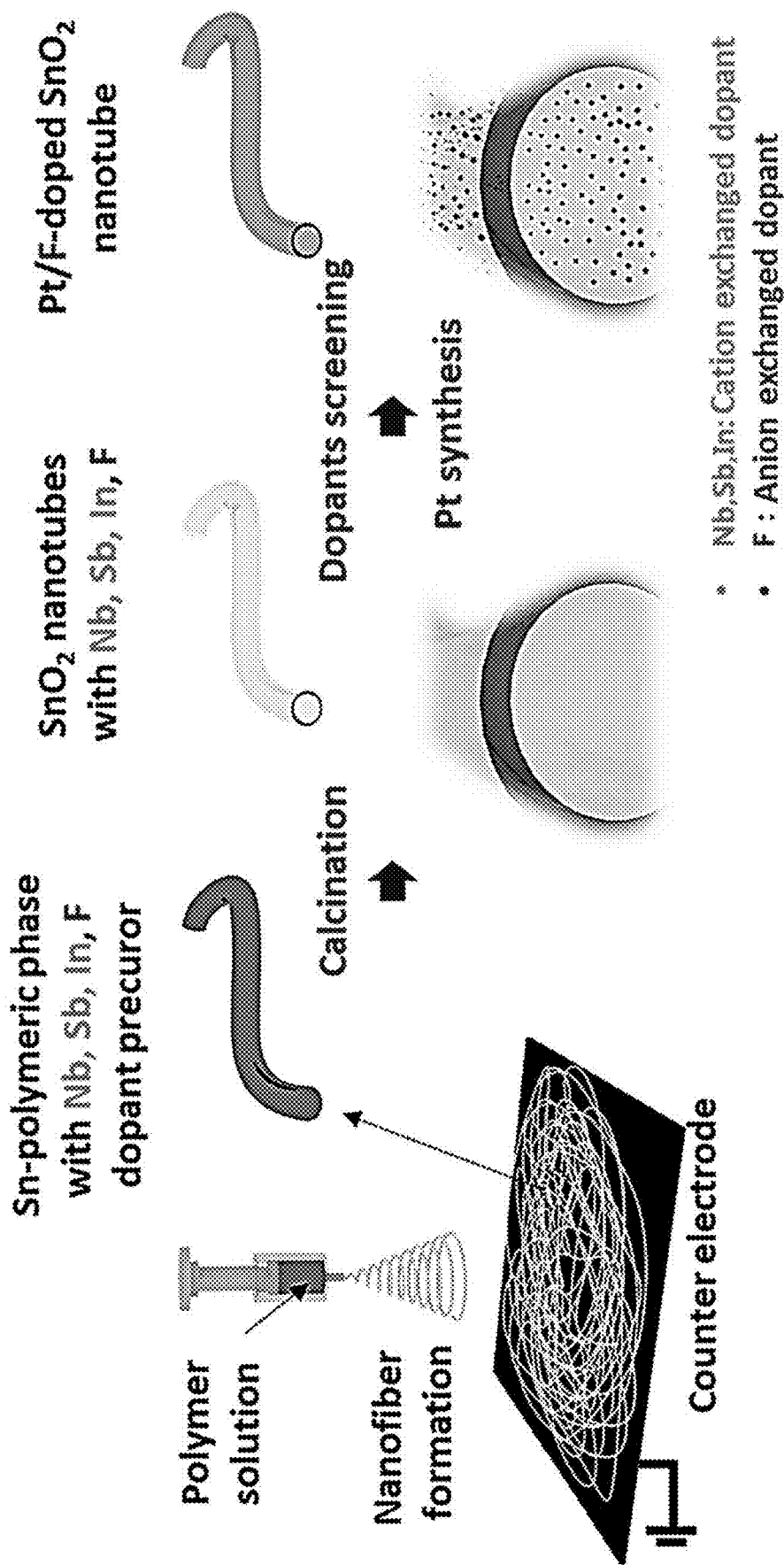
FIG. 1 is a diagram showing a process for producing a tin oxide nanotube comprising various doping elements using an electrospinning process according to one embodiment of the present disclosure, and a process of supporting a platinum nanoparticle on a tin oxide nanotube support doped with fluorine, which is a anion substitution type among the various doping elements.

Hereinafter, embodiments of the present disclosure will be described in detail with reference to the accompanying drawings.

Embodiments of the present disclosure disclosed herein are for illustrative purposes only, and the present disclosure may have various modifications and various forms. Embodiments are not intended to limit the present disclosure to specific embodiments, and it is to be understood that the present disclosure covers all modifications, equivalents, and alternatives falling within the spirit and technical scope of the present disclosure.

Although tin oxide-based nanomaterials having excellent electrochemical durability have attracted spotlight as a substitute for carbon-based materials commercially available as supports of electrochemical catalysts, there is a problem in that tin oxide-based nanomaterials have low electrical conductivity, which makes it difficult to use them as electrochemical catalyst supports. Accordingly, one embodiment of the present disclosure provides a tin oxide support doped with a fluorine element in order to impart high electrical conductivity to the tin oxide support. In one embodiment, the tin oxide support doped with the fluorine element may be in a form of nanotubes, nanofibers, nanoparticles, or microparticles. In one embodiment, the nanotube support has a large specific surface area and a space formed therein, and may provide excellent electrical conductivity when a catalyst is applied. As an embodiment of the present disclosure, the tin oxide may comprise any tin oxide-based material comprising SnO$_2$ as a support without limitation. There have been examples in which other elements such as Nb, In, Sb, As, P, and N have been applied as dopants. However, in these cases, an elution issue of doped elements or tin elements occurs during a driving process of fuel cells in which a catalyst is applied, and even a small amount of element elution also seriously affects the electrical conductivity of the support, thus leading to deterioration of fuel cell performance. However, the present disclosure minimizes an elution issue of the dopant or tin element of the conventional tin oxide-based support by applying a fluorine element in the form of an anion substitution as a dopant, and provides a highly durable catalyst support that can minimize the reduction of fuel cell performance due to electrochemical corrosion.

In one embodiment, the fluorine may be doped at 5 to 10 at (atomic) % based on the total number of atoms of the support. Specifically, the fluorine may be doped at 5 at % or more, 5.5 at % or more, 6 at % or more, 6.5 at % or more, 7 at % or more, 7.5 at % or more, 8 at % or more, 8.5 at % or more, 9 at % or more, 9.5 at % or more, or 9.9 at % or more, and 10 at % or less, 9.5 at % or less, 9 at % or less, 8.5 at % or less, 8 at % or less, 7.5 at % or less, 7 at % or less, 6.5 at % or less, 6 at % or less, 5.5 at % or less, or 5.1 at % or less based on the total number of atoms of the support. When the fluorine is doped at less than 5 at % or more than 10 at % of the total number of atoms of the support, there is a problem in that the electrical conductivity of the catalyst support is rather reduced.

One embodiment of the present disclosure provides a platinum catalyst for a fuel cell comprising platinum nanoparticles, and the tin-based oxide support doped with fluorine. In one embodiment, the platinum nanoparticles may be supported on the tin-based oxide support doped with fluorine. At this time, in the case of the platinum nanoparticles synthesized on the tin oxide support, compressive deformation occurs in the lattice due to strong mutual attraction between the oxide support and the platinum particles, resulting in weak adsorption strength with oxygen species, which may eventually improve the catalytic properties.

In one embodiment, the platinum nanoparticles may be platinum nanoparticles having an average particle diameter of 2 nm to 5 nm. Specifically, the average particle diameter of the platinum nanoparticles may be 2 nm or more, 2.5 nm or more, 3 nm or more, 3.5 nm or more, 4 nm or more, 4.5 nm or more, or 4.9 nm or more, and 5 nm or less, 4.5 nm or less, 4 nm or less, 3.5 nm or less, 3 nm or less, 2.5 nm or less, or 2.1 nm or less. When the average particle diameter of the platinum nanoparticles is less than 2 nm or more than 5 nm, the mass activity of the platinum nanoparticles may be reduced.

In one embodiment, the platinum nanoparticles may be comprised in an amount of 30% to 50% by weight based on the total weight of the catalyst. Specifically, the platinum nanoparticles may be comprised in an amount of 30% by weight or more, 31% by weight or more, 32% by weight or more, 33% by weight or more, 34% by weight or more, 35% by weight or more, 36% by weight or more, 37% by weight or more, 38% by weight or more, 39% by weight or more, 40% by weight or more, 41% by weight or more, 42% by weight or more, 43% by weight or more, 44% by weight or more, 45% by weight or more, 46% by weight or more, 47% by weight or more, 48% by weight or more, 49% by weight or more, or 49.9% by weight or more, and 50% by weight or less, 49% by weight or less, 48% by weight or less, 47% by weight or less, 46% by weight or less, 45% by weight or less, 44% by weight or less, 43% by weight or less, 42% by weight or less, 41% by weight or less, 40% by weight or less, 39% by weight or less, 38% by weight or less, 37% by weight or less, 36% by weight or less, 35% by weight or less, 34 by weight or less, 33% by weight or less, 32% by weight or less, 31% by weight or less, or 30.1% by weight or less based on the total weight of the catalyst. In addition, as an embodiment, the fluorine-doped tin oxide nanotube support may be comprised in an amount of 50% to 70% by weight based on the total weight of the catalyst. Specifically, the support may be comprised in an amount of 50% by weight or more, 51% by weight or more, 52% by weight or more, 53% by weight or more, 54% by weight or more, 55% by weight or more, 56% by weight or more, 57% by weight or more, 58% by weight or more, 59% by weight or more, 60% by weight or more, 61% by weight or more, 62% by weight or more, 63% by weight or more, 64% by weight or more, 65% by weight or more, 66% by weight or more, 67% by weight or more, 68% by weight or more, 69% by weight or more, or 69.9% by weight or more, and 70% by weight or less, 69% by weight or less, 68% by weight or less, 67% by weight or less, 66% by weight or less, 65% by weight or less, 64% by weight or less, 63% by weight or less, 62% by weight or less, 61% by weight or less, 60% by weight or less, 59% by weight or less, 58% by weight or less, 57% by weight or less, 56% by weight or less, 55% by weight or less, 54% by weight or less, 53% by weight or less, 52% by weight or less, 51% by weight or less, or 50.1% by weight or less based on the total weight of the catalyst. When the platinum nanoparticles are comprised in an amount of less than 30% by weight based on the total weight of the catalyst, the catalyst layer may be thickened, thereby reducing the cell performance of fuel cells. When the platinum nanoparticles are comprised in an amount of more than 50% by weight, the surface area of the fluorine-doped tin oxide support is relatively small to highly support the platinum catalyst as described above. Thus, there may be a problem in that when the platinum particles are supported, they aggregate together in the absence of a surface area.

One embodiment of the present disclosure may provide an oxidation reduction electrode for a fuel cell comprising the platinum catalyst.

In one embodiment, the oxidation reduction electrode may further comprise at least one carbon material selected from graphitic carbon, carbon nanotubes, and graphene as an additive, and may be used together with the platinum catalyst. Any additive may be comprised as an additive without limitation as long as it is a material having a super-hydrophobicity and excellent conductivity. The graphitic carbon is a high crystalline carbon black having a much higher ratio of a crystalline component than an amorphous component. The high crystalline carbon material as described above has a small surface area on which a platinum catalyst can be supported, and thus cannot be easily utilized as a support itself. However, when it is further comprised as an additive together with the catalyst according to an embodiment of the present disclosure, the electrical conductivity and water discharge characteristics of a catalyst may be improved.

In one embodiment, the content of the additive may vary depending on the size of the tin-based oxide support of the present disclosure or the amount of the platinum catalyst supported. For example, the additive may be comprised in an amount of 5% to 15% by weight based on the total weight of the catalyst. Specifically, the additive may be comprised in an amount of 5% by weight or more, 6% by weight or more, 7% by weight or more, 8% by weight or more, 9% by weight or more, 10% by weight or more, 11% by weight or more, 12% by weight or more, 13% by weight or more, 14% by weight or more, or 14.9% by weight or more, and 15% by weight or less, 14% by weigh or less, 13% by weight or less, 12% by weight or less, 11% by weight or less, 10% by weight or less, 9% by weight or less, 8% by weight or less, 7% by weight or less, 6% by weight or less, or 5.1% by weight or less based on the total weight of the catalyst. When the additive is comprised in less than 5% by weight based on the total weight of the catalyst, the water generated after the fuel cell reaction may stagnate on the surface of the catalyst due to the hydrophilic support, causing flooding, thereby reducing fuel cell performance. When the additive is comprised in an amount of more than 15% by weight based on the total weight of the catalyst, the catalyst layer may be thickened, and thus the fuel cell performance may be deteriorated because the moving path of the material required for reaction becomes longer.

One embodiment of the present disclosure may provide a fuel cell comprising the platinum catalyst, and furthermore, this may be widely applied to a vehicle such as an automobile, a portable battery, and a household battery, in which the fuel cell may be used.

Another embodiment of the present disclosure may provide a method for producing a fluorine-doped tin oxide support, wherein the production method may comprise electrospinning a solution comprising a tin precursor and a fluorine precursor to produce a tin oxide nanofiber doped with fluorine, and heat-treating the nanofiber to produce a nanotube.

In one embodiment, the producing of the nanofibers may comprise adding a tin precursor and a nanotube template material to a spinning solvent, and adding and mixing a fluorine precursor thereto. As used herein, the term "nanotube template material" means a material that is used as a template in the electrospinning process to help form a nanotube structure of nanofibers, and is finally removed through heat treatment. In an embodiment of the present disclosure, the nanotube template material may comprise one or more selected from the group consisting of polyvinylpyrrolidone (PVP), polyvinylidene fluoride (PVdF), polyamides (Nylon), and polyurethane (PU), more specifically, thermoplastic polyurethane (TPU), polyvinyl alcohol (PVA), and polysulfone (PSU), and more specifically, polyether sulfone (PES), polyethylene oxide (PEO), polyacrylonitrile (PAN), polybenzimidazole (PBI), polyaniline (PA), polyimide (PI), polystyrene (PS), polyvinyl chloride (PVC), cellulose acetate, Chitosan, Silk, Collagen, poly-gamma-glutamic acid (PGA), poly lactic acid (PLA), and polycaprolactone (PCL). In one embodiment, the production may comprise a step of adding 5% to 17% by weight of the tin precursor based on the total weight of the solvent and 10% to 23% by weight of the nanotube template material based on the total weight of the solvent to the spinning solvent, and mixing 5% to 40 mol % of a fluorine precursor therein.

In one embodiment, any tin precursor may be comprised without limitation as long as it is a metal oxide precursor comprising tin element (Sn). For example, the tin precursor may comprise one or more selected from the group consisting of tin (II) chloride ($SnCl_2$), tin (II) chloride dehydrate ($SnCl_2 2H_2O$), tin (IV) chloride pentahydrate ($SnCl_2 2 5H_2O$), hexamethylditin (($CH_3$)$_3$SnSn($CH_3$)$_3$), trimethyltin chloride (($CH_3$)$_3$SnCl), tributylchlorotin ([$CH_3(CH_2)_3$]3SnCl), and tributyltin chloride ([$CH_3(CH_2)_3$]3SnCl).

In one embodiment, the fluorine precursor may comprise ammonium fluoride ($NH_4F$).

In one embodiment, any solvent may be comprised without limitation as long as it is highly volatile and the tin precursor and the fluorine precursor and the nanotube template material can be dissolved. For example, the solvent may be a mixture of dimethylformamide (DMF) and ethanol, where the mixing ratio may be, for example, 1.1.

In one embodiment, the producing of the nanofibers may comprise injecting a solution comprising the tin precursor and the fluorine precursor at 0.3 ml/h to 0.7 ml/h while applying a voltage of 17 kV to 20 kV to spin the solution to a conductive substrate. If the flow rate and voltage fall outside the range, there is a problem in that it is difficult to form nanofibers, or the nanofibers are formed too thick. Specifically, the production may comprise injecting a solution comprising the tin precursor and the fluorine precursor at 0.3 ml/h to 0.7 ml/h while applying a voltage of 17 kV to 20 kV to spin the solution to an aluminum foil substrate or a stainless substrate.

In one embodiment, the producing of the nanotubes by heat treatment of the nanofibers may comprise collecting the spun nanofibers, and heat treating the same. In one embodiment, the heat treatment of the nanofibers may comprise heat treatment at 500° C. to 700° C. for 1 to 3 hours in an oxygen or air atmosphere. The heat treatment removes the nanotube template material comprised in the spinning solution, thereby obtaining a fluorine-doped tin oxide support in the form of nanotubes.

One embodiment of the present disclosure may provide a method for producing a platinum catalyst for a fuel cell, wherein the method may comprise supporting platinum nanoparticles on a fluorine-doped tin oxide support. In one embodiment, the production method may further comprise producing a fluorine-doped tin oxide support by the above-described method.

In one embodiment, the platinum nanoparticles may be platinum nanoparticles having an average particle diameter of 2 nm to 5 nm. Specifically, the average particle diameter of the platinum nanoparticles may be 2 nm or more, 2.5 nm or more, 3 nm or more, 3.5 nm or more, 4 nm or more, 4.5 nm or more, or 4.9 nm or more, and 5 nm or less, 4.5 nm or less, 4 nm or less, 3.5 nm or less, 3 nm or less, 2.5 nm or less, or 2.1 nm or less. When the average particle diameter of the platinum nanoparticles is less than 2 nm or more than 5 nm, the mass activity of the platinum nanoparticles may be reduced.

In one embodiment, the platinum nanoparticles may be supported in an amount of 30% to 50% by weight based on the total weight of the catalyst. Specifically, the platinum nanoparticles may be supported in an amount of 30% by weight or more, 31% by weight or more, 32% by weight or more, 33% by weight or more, 34% by weight or more, 35% by weight or more, 36% by weight or more, 37% by weight or more, 38% by weight or more, 39% by weight or more, 40% by weight or more, 41% by weight or more, 42% by weight or more, 43% by weight or more, 44% by weight or more, 45% by weight or more, 46% by weight or more, 47% by weight or more, 48% by weight or more, 49% by weight or more, or 49.9% by weight or more, and 50% by weight or less, 49% by weight or less, 48% by weight or less, 47% by weight or less, 46% by weight or less, 45% by weight or less, 44% by weight or less, 43% by weight or less, 42% by weight or less, 41% by weight or less, 40% by weight or less, 39% by weight or less, 38% by weight or less, 37% by weight or less, 36% by weight or less, 35% by weight or less, 34% by weight or less, 33% by weight or less, 32% by weight or less, 31% by weight or less, or 30.1% by weight or less based on the total weight of the catalyst. When the platinum nanoparticles are supported in an amount of less than 30% by weight based on the total weight of the catalyst, the catalyst layer may be thickened, thereby reducing the cell performance of fuel cells. When the platinum nanoparticles are supported in an amount of more than 50% by weight, the surface area of the fluorine-doped tin oxide support is relatively small to highly support the platinum catalyst as described above. Thus, there may be a problem in that when the platinum particles are supported, they aggregate together in the absence of a surface area.

In one specific embodiment, the supporting of the platinum nanoparticles on the fluorine-doped tin oxide support may comprise preparing a solution in which the fluorine-doped tin oxide support is dispersed, putting a platinum precursor into the solution and mixing the mixture, putting a reducing agent into the mixed solution to perform a reduction reaction, and collecting the powder by filtering the solution after reduction reaction and heat treating the collected powder to obtain a fluorine-doped tin oxide on which platinum nanoparticles are supported. In this case, as an embodiment, any platinum precursor may be comprised without limitation as long as it is a platinum precursor comprising platinum element (Pt). For example, the platinum precursor may comprise one or more selected from the group consisting of platinum (IV) chloride ($PtCl_4$), hydrogen hexahydroxyplatinate ($H_2Pt(OH)_6$), chloroplatinic acid hydrate (($PtCl_6$)($H_2O$)$_x$ ($0=x\leq=6$)), and platinum acetylacetonate ($Pt(CH_3COCHCOCH_3)_2$)). In one embodiment, the dispersion solvent may comprise ethanol or a solvent having a similar solubility as ethanol, for example methanol, 2-propanol, and acetone. In one embodiment, in the preparing of the solution in which the fluorine-doped tin oxide support is dispersed, the solution may further comprise a surfactant to form nanosized platinum particles, and the surfactant may comprise one or more selected from the group consisting of sodium acetate ($C_2H_3NaO_2$), tetraoctylammonium bromide ($[CH_3(CH_2)_7]_4N(Br)$), and oleylamine ($CH_3(CH_2)_7CH=CH(CH_2)_7CH_2NH_2$). Alternatively, as one embodiment, the same effect may be obtained by adjusting the pH to 10 or more by adding a potassium hydroxide solution instead of adding a surfactant to the solution. In one embodiment, it may further comprise sonication after the surfactant addition or pH adjustment as described above.

As one embodiment of the present disclosure, when preparing an oxidation reduction electrode using a catalyst prepared by the above method, at least one carbon material selected from graphitic carbon, carbon nanotubes, and graphene may be further comprised as an additive with the catalyst. Any additive may be used without limitation as long as it is a material having a super-hydrophobicity and excellent conductivity. In one embodiment, the content of the additive may vary depending on the size of the tin-based oxide support of the present disclosure or the amount of the platinum catalyst supported. For example, the additive may be comprised in an amount of 5% to 15% by weight based on the total weight of the catalyst. Specifically, the additive may be comprised in an amount of 5% by weight or more, 6% by weight or more, 7% by weight or more, 8% by weight or more, 9% by weight or more, 10% by weight or more, 11% by weight or more, 12% by weight or more, 13% by weight or more, 14% by weight or more, or 14.9% by weight or more, and 15% by weight or less, 14% by weigh or less, 13% by weight or less, 12% by weight or less, 11% by weight or less, 10% by weight or less, 9% by weight or less, 8% by weight or less, 7% by weight or less, 6% by weight or less, or 5.1% by weight or less based on the total weight of the catalyst. When the additive is comprised in less than 5% by weight based on the total weight of the catalyst, the catalyst layer is thin in thickness, and thus flooding may occur. When the additive is comprised in an amount of more than 15% by weight, the catalyst layer may be thickened, and thus the fuel cell performance may be deteriorated because the moving path of the material required for reaction becomes longer.

The platinum catalyst comprising the fluorine-doped tin oxide support prepared as described above has high electrical conductivity and excellent electrochemical corrosion resistance. Therefore, it may be used as an electrode catalyst of a fuel cell by replacing a platinum catalyst comprising a carbon-based support used in a polymer electrolyte membrane fuel cell.

Hereinafter, the present disclosure will be described in detail with reference to the examples, comparative examples and test examples. These examples are only presented by way of example to more specifically describe the present disclosure, and it is apparent to those skilled in the art that the scope of the present disclosure is not limited by these examples, comparative examples and test examples.

EXAMPLE 1

A fluorine-doped tin oxide nanotube support according to an embodiment of the present disclosure was prepared by the following method using an electrospinning process (see FIG. 1).

5.4 g of a mixed solution of dimethylformamide (DMF) and ethanol in a 1:1 ratio was prepared as a spinning solvent, about 0.5 g of $SnCl_2 2H_2O$, which is a tin precursor, and about 0.7 g of polyvinylpyrrolidone (PVP) were added, and $NH_4F$, which is a precursor of fluorine, a doping element, was mixed at a ratio of 30 mol %. The spinning solution was injected at a flow rate of 0.4 ml/hour and a voltage was applied between 18 kV to spin the solution on an aluminum foil substrate. The spun nanofibers were collected, and heat treated at 600° C. for 1 hour in an oxygen or air atmosphere to remove a PVP polymer. Finally, tin oxide nanotubes doped with fluorine element (F) were obtained as shown in FIGS. 2A and 2B.

COMPARATIVE EXAMPLES 1 TO 3

Figure 2A:
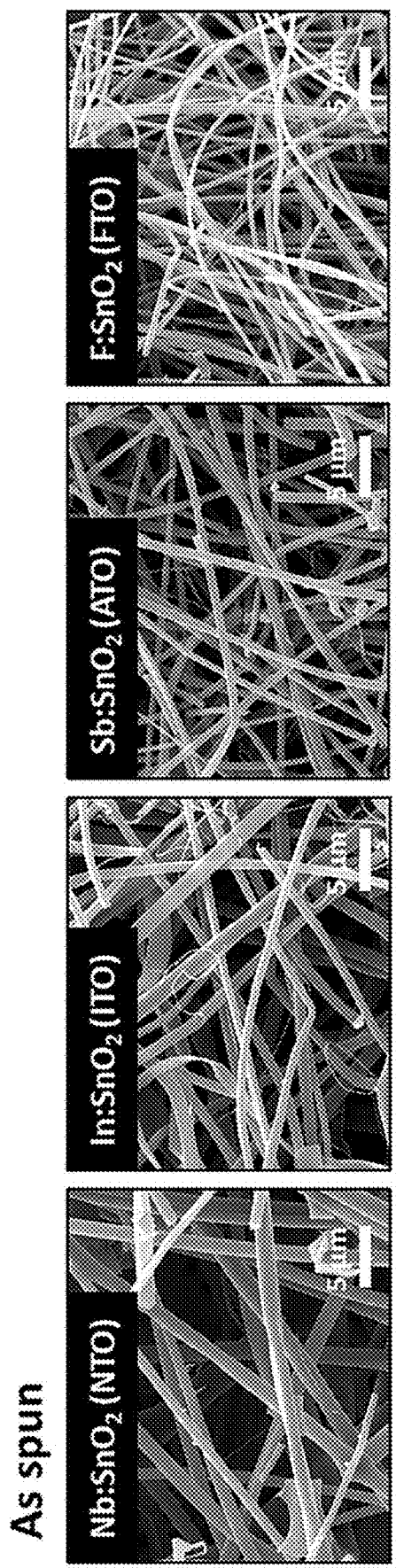
FIG. 2A is a diagram showing a scanning electron microscope (SEM) image showing the nanofibers spun during the production of a tin oxide nanotube comprising various doping elements (a: Nb, b:Sn, c: Sb, d: F) in one embodiment of the present disclosure.
Figure 2B:
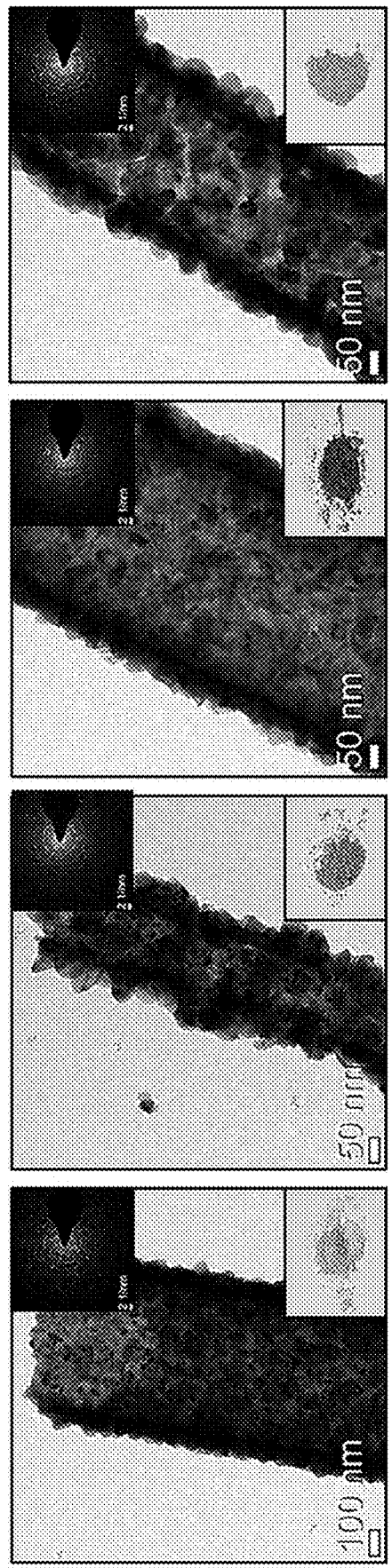
FIG. 2B is a transmission electron microscope (TEM) image showing a nanotube form after heat treatment (after calcination).

As a comparative example of the present disclosure, tin oxide nanotubes doped with Nb, Sn, and Sb, respectively, were obtained as in FIGS. 2A and 2B in the same manner as Example 1 above except that $InCl_3$, $NbCl_5$, and $SbCl_3$ were used as precursors of the doping elements (Comparative Examples 1 to 3). In this case, ITO (indium tin oxide) using $InCl_3$ as a precursor is a series of tin oxide, but NTO (Niobioum Tin Oxide), FTO (fluorine tin oxide), and ATO (antimony tin oxide), which use $NbCl_5$, $NH_4F$, and $SbCl_3$ as precursors, respectively, has indium oxide as the host material and Sn acts as a dopant.

TEST EXAMPLE 1

Cyclic voltammetry (CV) was measured to examine the electrochemical corrosion resistance of the tin oxide nanotubes doped with four dopants prepared in Example 1 and Comparative Examples 1 to 3 above, respectively.

Potentiostat equipment was used to carry out the above experiment, and 0.1 M of perchloric acid ($HClO_4$) was directly prepared and applied as an electrolyte solution. A $Hg/Hg_2Cl_2$ electrode was used as a reference electrode, which is the reference, and platinum fiber (Pt wire) was used as a counter electrode. Correspondingly, a platinum nanocatalyst was used as a working electrode of a half cell test to check the electrochemical characteristics of a rotating disk electrode (RDE) having an area of 0.196 $cm^2$.

Figure 3:
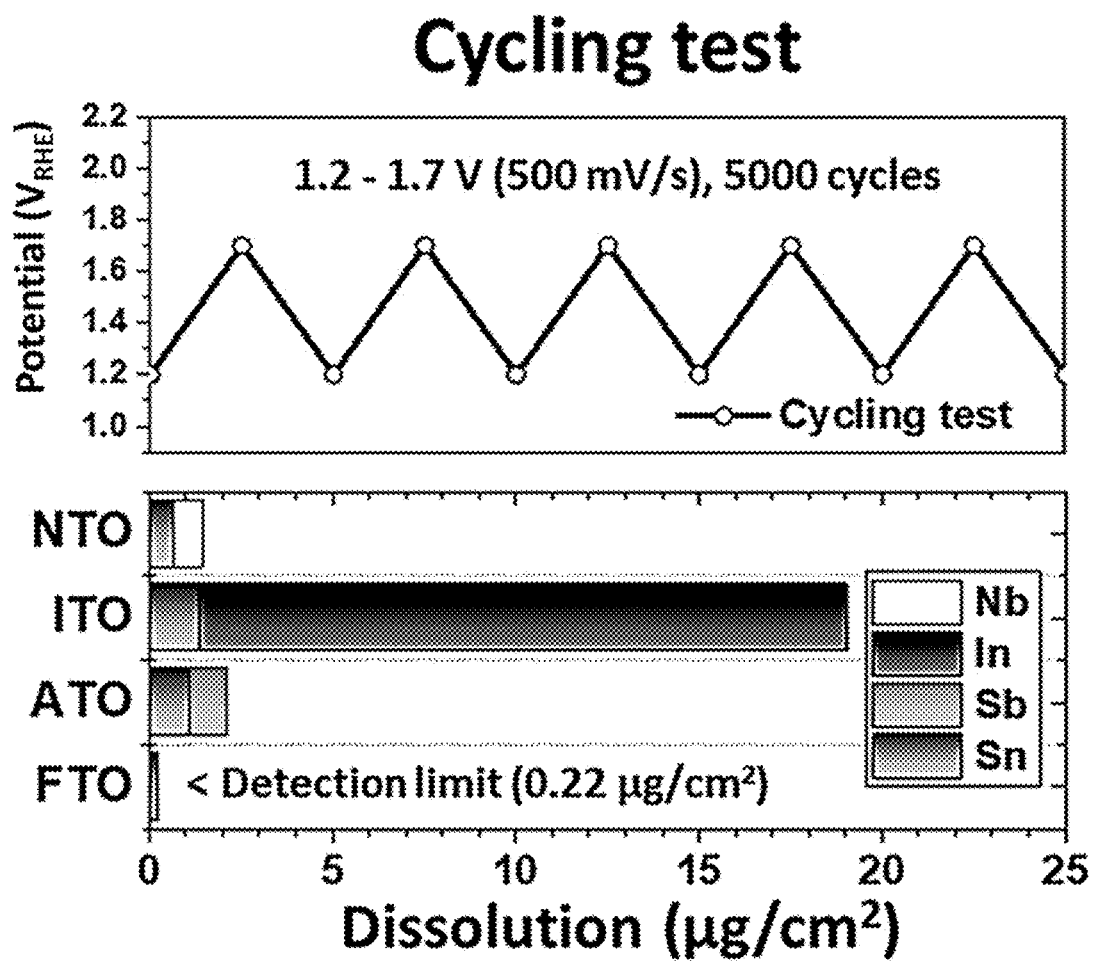
FIG. 3 is a diagram showing a cycling test result of analyzing an element elution volume with ICP-MS (inductively coupled plasma-mass spectroscopy) in an electrolyte after the electrochemical degradation test of tin oxide nanotubes comprising various doping elements in one embodiment of the present disclosure.
Figure 4:
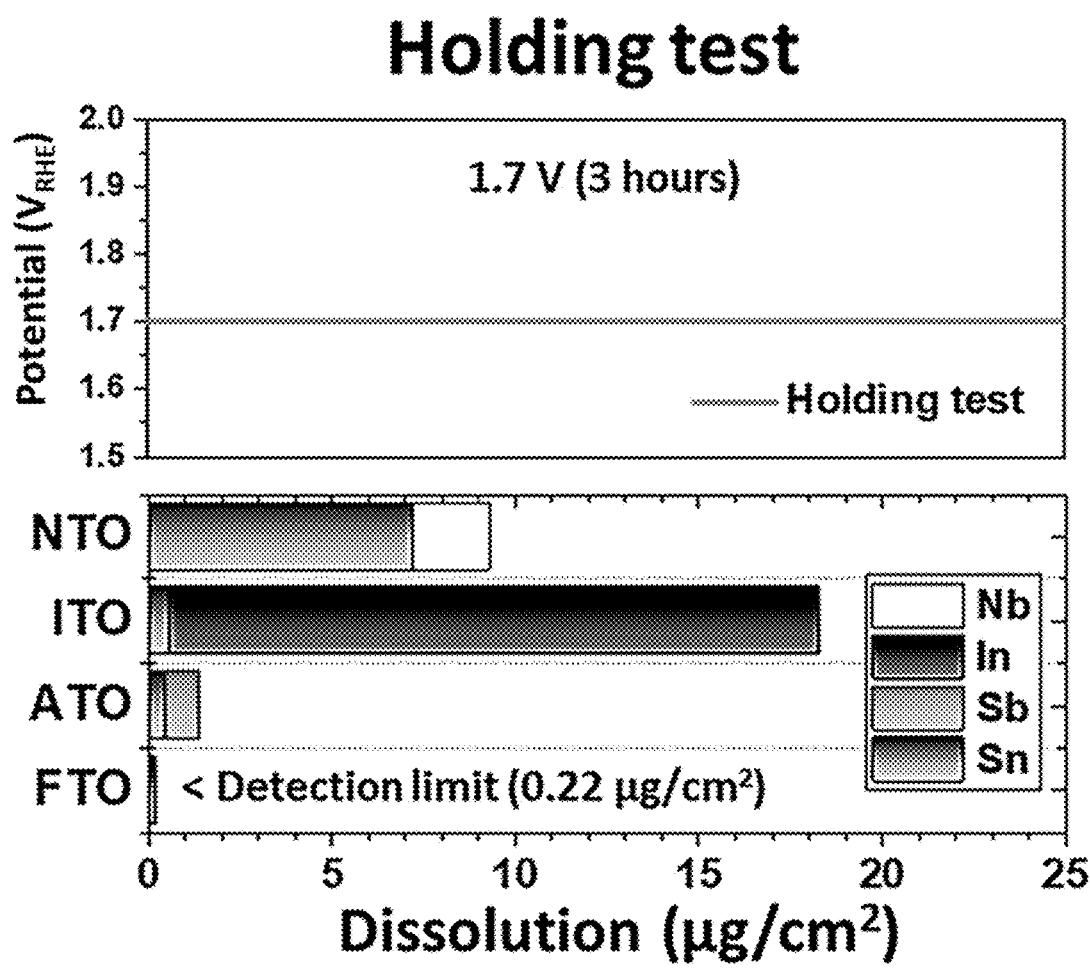
FIG. 4 is a diagram showing a holding test result of analyzing an element elution volume with ICP-MS (inductively coupled plasma-mass spectroscopy) in an electrolyte after the electrochemical degradation test of tin oxide nanotubes comprising various doping elements in one embodiment of the present disclosure.

In order to proceed with the CV experiment, a half cell reaction experiment (half cell test) was prepared as described above, and argon (Ar) gas was gas purged for 30 minutes at a flow rate 400 ml/min so as to stabilize the voltage of a working electrode (WE) in the prepared experimental device. After sufficient purging, two corrosion protocols were applied. As shown in FIG. 3, first, 5,000 cycling tests were applied up to 1.2-1.7 V, and second, as shown in FIG. 4, a holding test maintained at 1.7 V for 3 hours was applied. After each corrosion test, 70 ml of each electrolyte was collected, and elution of doping elements and tin of tin oxide nanotubes in each of Example 1 and Comparative Examples 1 to 3 were analyzed through an inductively coupled plasma-mass spectrometry (ICP-MS).

As a result, in the case of tin oxide nanotubes doped with fluorine (F), which is an anion substitution doping method, tin elution below the element detection limit (0.22 µg/cm$^2$) was found in both the cycling test and the holding test. Not only has a fluorine element been found to be suitable as a doping element of a tin-based oxide, it has also been shown to have very good electrochemical durability compared to other dopant-based tin oxide nanotubes. On the other hand, in the case of a tin oxide comprising Nb, In or Sb, which is based on a cation substituted doping, it was found that a large amount of tin element as well as each of the dopants were eluted.

EXAMPLE 2

As an embodiment of the present disclosure, a platinum catalyst comprising a fluorine-doped tin oxide support on which platinum nanoparticles were supported was prepared as follows.

Figure 5:
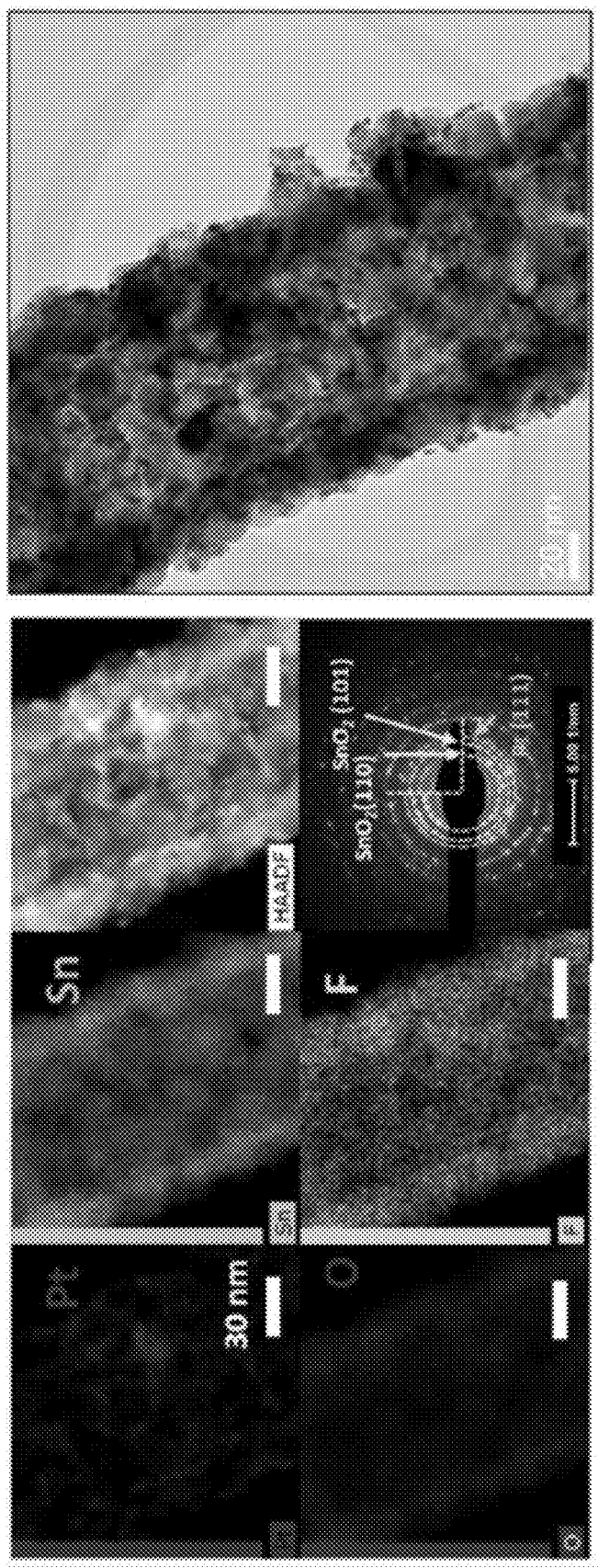
FIG. 5 is a diagram showing TEM images and energy dispersive X-ray spectrometer (EDS) element mapping results in which platinum is supported on a tin oxide nanotube support doped with fluorine produced in one embodiment of the present disclosure.

In order to support 40% by weight of platinum particles on the fluorine-doped tin oxide nanotube prepared in Example 1 above, 0.05 g of a fluorine-doped tin oxide nanotube was dispersed for 1 hour in 300 mL of ethanol. 0.48 g of $C_2H_3NaO_2$, a surfactant, was dissolved in a vial comprising 20 ml of ethanol, and placed in the ethanol solution in which fluorine-doped tin oxide nanotubes were dispersed, followed by sufficient sonication for 1 hour. Thereafter, 0.057 g of the platinum precursor $PtCl_4$ was dissolved in a vial comprising 20 ml of ethanol, and then put into the previously prepared solution, followed by sufficient stirring for 1 hour. Thereafter, 0.22 g of $NaBH_4$ was dissolved in 20 ml of an ethanol solution as a reducing agent, and then put into the previously prepared solution, followed by sufficient reduction reaction for 3 hours. After the reaction, filtering was performed to collect the powder, and heat treatment was performed at 200° C. for 1 hour in an air atmosphere to finally obtain the fluorine-doped tin oxide nanotubes on which platinum is supported as shown in FIG. 5.

TEST EXAMPLE 2

The following experiment was performed to analyze the electrochemical oxygen reduction reaction characteristics and electrochemical durability of a platinum catalyst comprising the fluorine-doped tin oxide support on which the platinum nanoparticles prepared in Example 2 above were supported.

At this time, a commercially available platinum/carbon (Pt/C) catalyst (manufacturer: Tanaka, product name: Pt/C (Pt 46.2 wt %)) was used as a comparative example (Comparative Example 4).

The electrochemical oxygen reduction reaction characteristics of each platinum catalyst was confirmed by a half cell test. The electrochemical durability of each platinum catalyst was confirmed by the catalyst durability test (0.6-1.1 VRHE, 6000 cycles) of the CV curve.

Specifically, potentiostat equipment was used to conduct the half cell test, and about 100 mL of $H_2SO_4$ at a concentration of 0.5 M was directly prepared and applied as an electrolyte solution. $Hg/Hg_2Cl_2$ electrode was used as a reference electrode, which is the reference, and a Pt wire was used as a counter electrode. Correspondingly, the platinum nanocatalyst was laminated on 0.196 cm$^2$ area of glassy carbon to fabricate a rotating disk electrode (RDE) as a working electrode for half cell reaction experiments to check electrochemical characteristics. Then, the characteristics of the catalyst and the support were confirmed.

In cyclic voltammetry (CV) experiments, a half cell test was first prepared as described above, and gas purging was performed for 30 minutes to stabilize the voltage of a working electrode (WE) at a flow rate of Ar 400 ml/min in the prepared experimental device. Cyclic voltammetry experiments were conducted 10 times in total by applying a circulating voltage to the purged experimental device at a rate of 50 mV/s from 0.05 V to 1.1 V. The tenth data obtained from the performed experiments was used as the main result.

In the case of oxygen reduction reaction (ORR) measurement, after the cyclic voltammetry experiment described above, oxygen was purged at a flow rate of 400 ml/min to create an environment in which the working electrode (WE) could react with oxygen in the electrolyte. The experiment was conducted after the voltage of the working electrode (WE) was stabilized in the same manner as the cyclic voltammetry experiment, and at this time, the purging time was 30 minutes or more. After gas purging was completed, ORR was measured twice at a rate of 5 mV/s from 0.05 V to 1.1 V, and the value obtained in the second measurement was used as the ORR curve measurement result.

Figure 6:
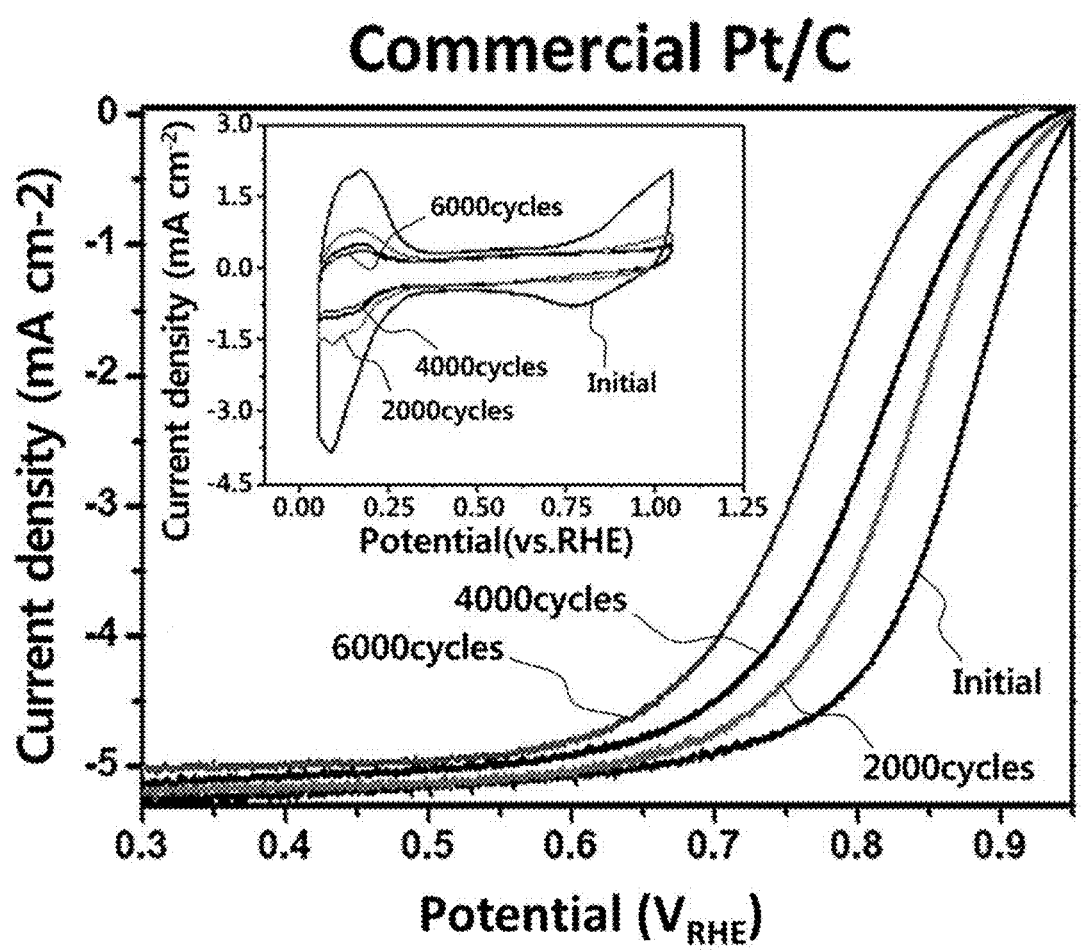
FIG. 6 is a diagram showing an oxygen reduction reaction catalyst activity through a half-cell degradation test of the commercial catalyst (commercial Pt/C) of the comparative example of the present disclosure.
Figure 7:
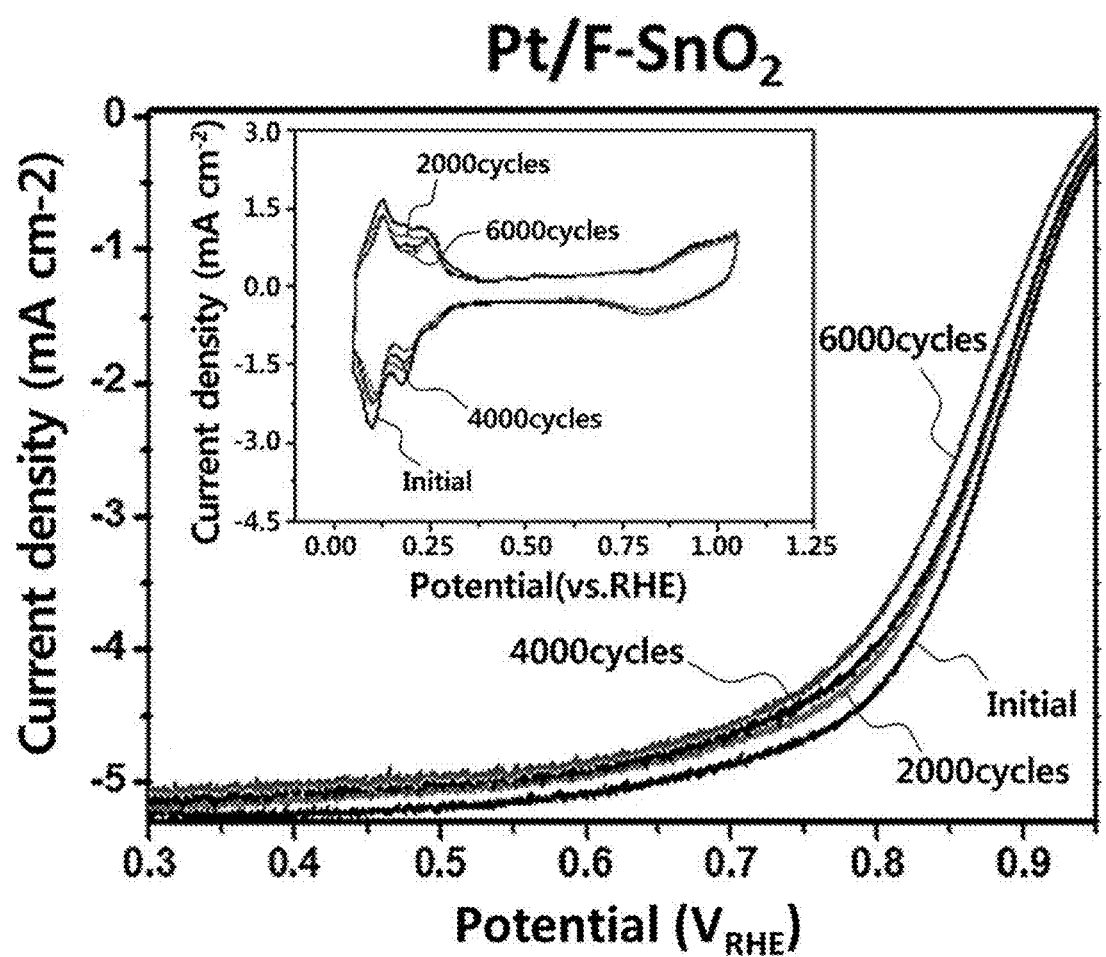
FIG. 7 is a diagram showing an oxygen reduction reaction catalyst activity through a half-cell degradation test of a three-dimensional fluorine-doped tin oxide nanotube support-based platinum catalyst (Pt/F:SnO$_2$) prepared in one embodiment of the present disclosure.
Figure 8:
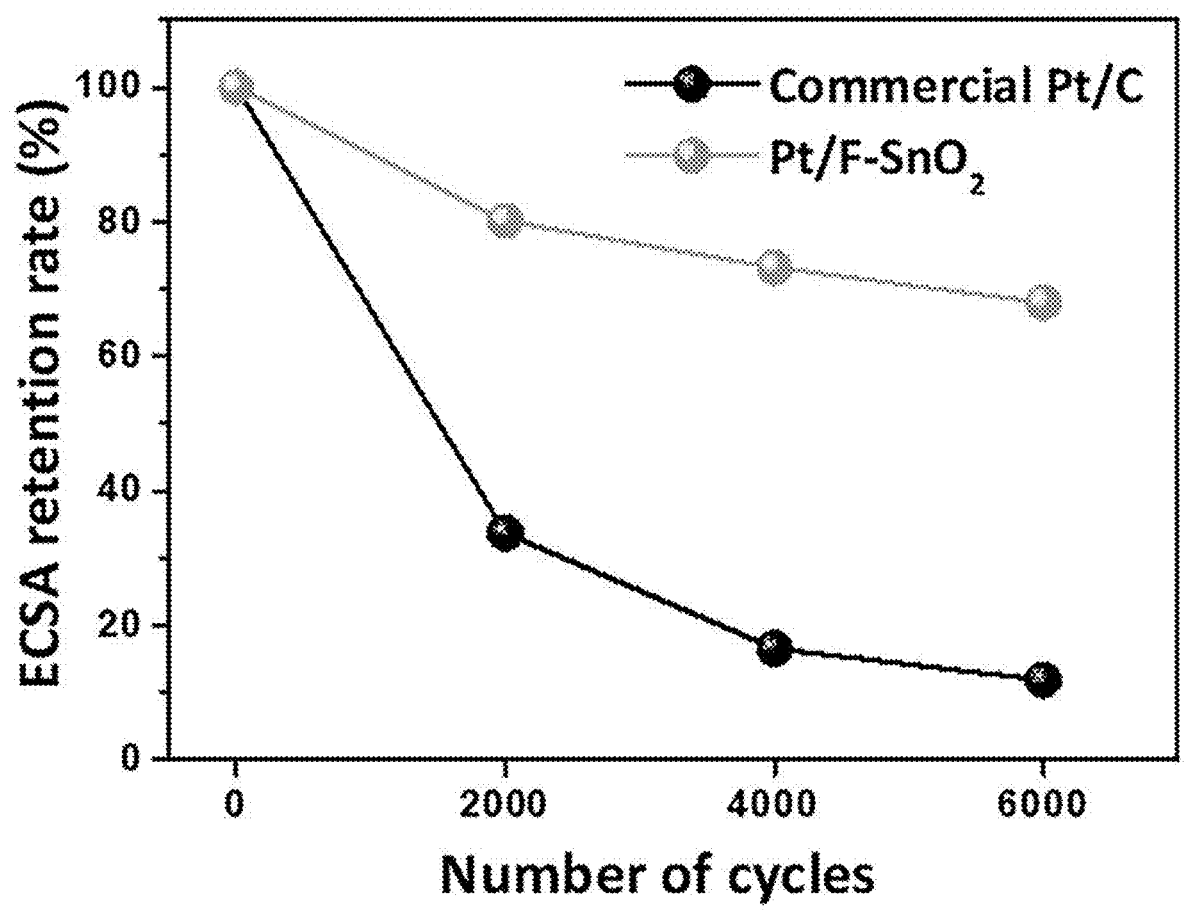
FIG. 8 is a diagram showing an electrochemically active surface area (ECSA) change graph of a three-dimensional fluorine-doped tin oxide nanotube support-based platinum catalyst (Pt/F:SnO$_2$) and a commercially available catalyst (commercial Pt/C) prepared in one embodiment of the present disclosure.
Figure 9:
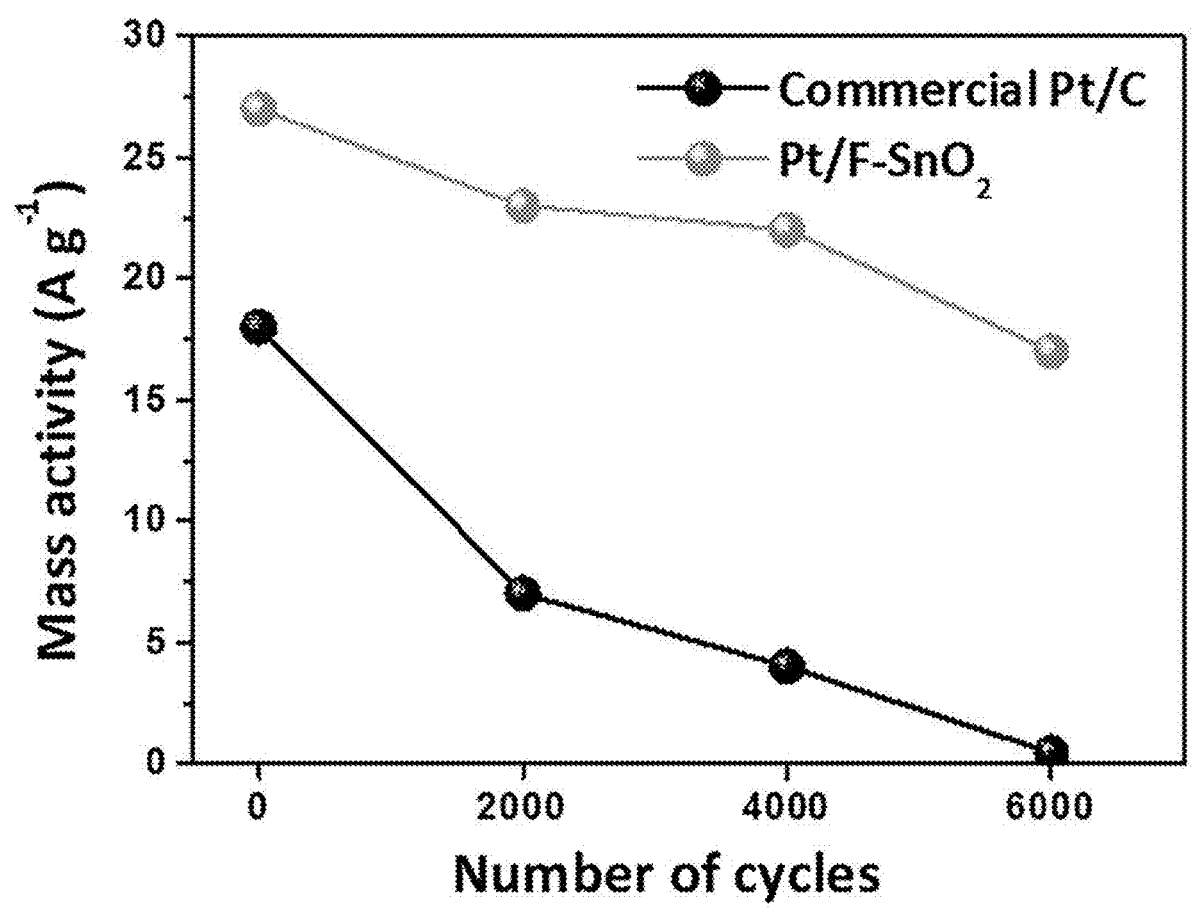
FIG. 9 is a diagram showing a mass activity change graph of a three-dimensional fluorine-doped tin oxide nanotube support-based platinum catalyst (Pt/F:SnO$_2$) and a commercially available catalyst (commercial Pt/C) prepared in one embodiment of the present disclosure.
Figure 10:
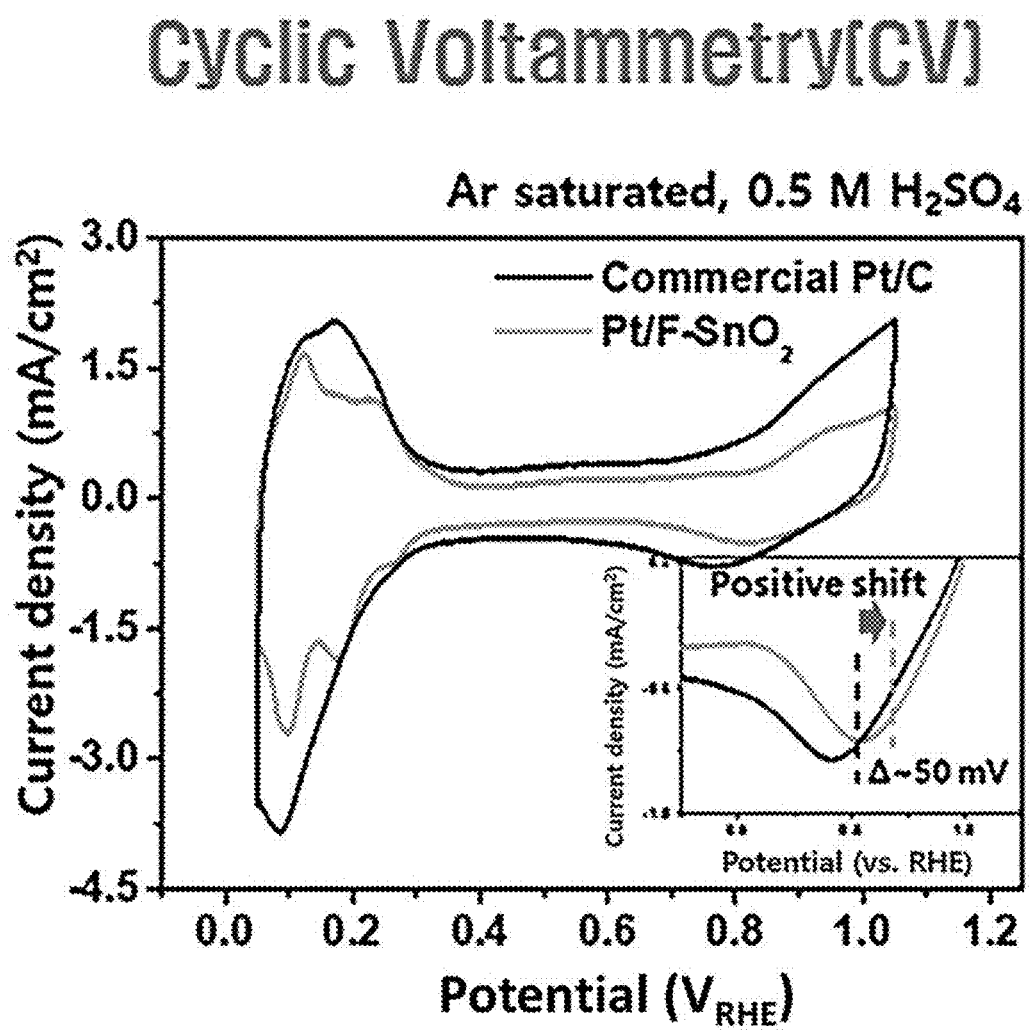
FIG. 10 is a diagram of analyzing a cyclic voltammetry (CV) characteristic of a three-dimensional fluorine-doped tin oxide nanotube support-based platinum catalyst (Pt/F:SnO$_2$) and a commercially available catalyst (commercial Pt/C) prepared in one embodiment of the present disclosure.
Figure 11:
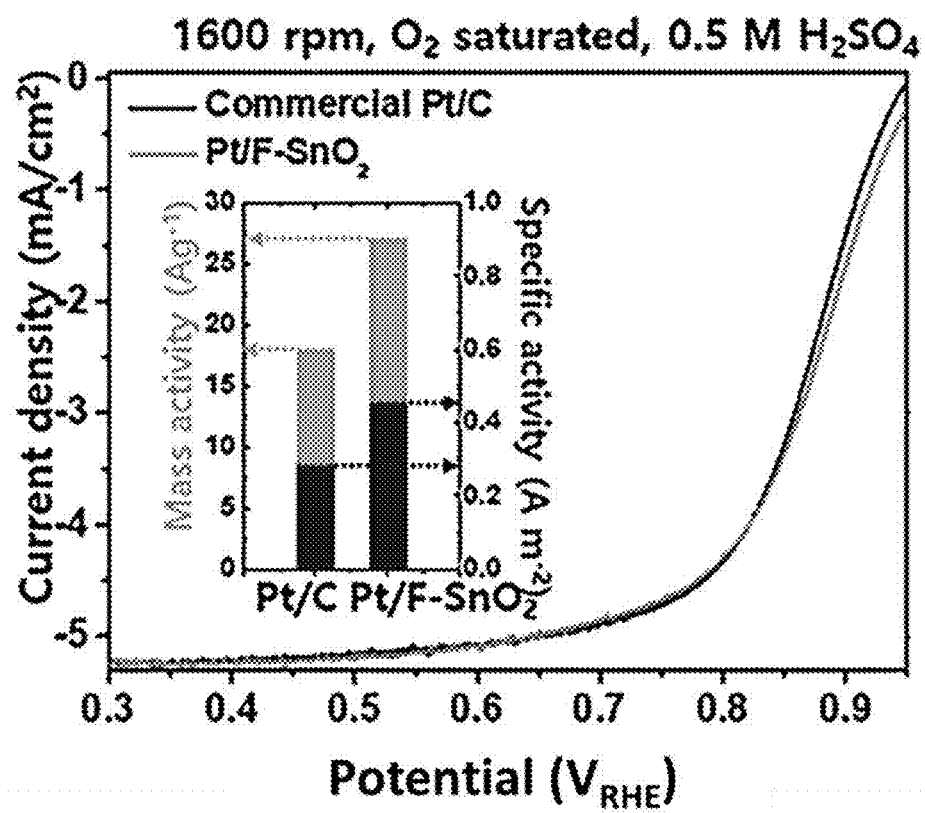
FIG. 11 is a diagram showing an oxygen reduction reaction (ORR) measurement result of a three-dimensional fluorine-doped tin oxide nanotube support-based platinum catalyst (Pt/F:SnO$_2$) and a commercially available catalyst (commercial Pt/C) prepared in one embodiment of the present disclosure.
Figure 12:
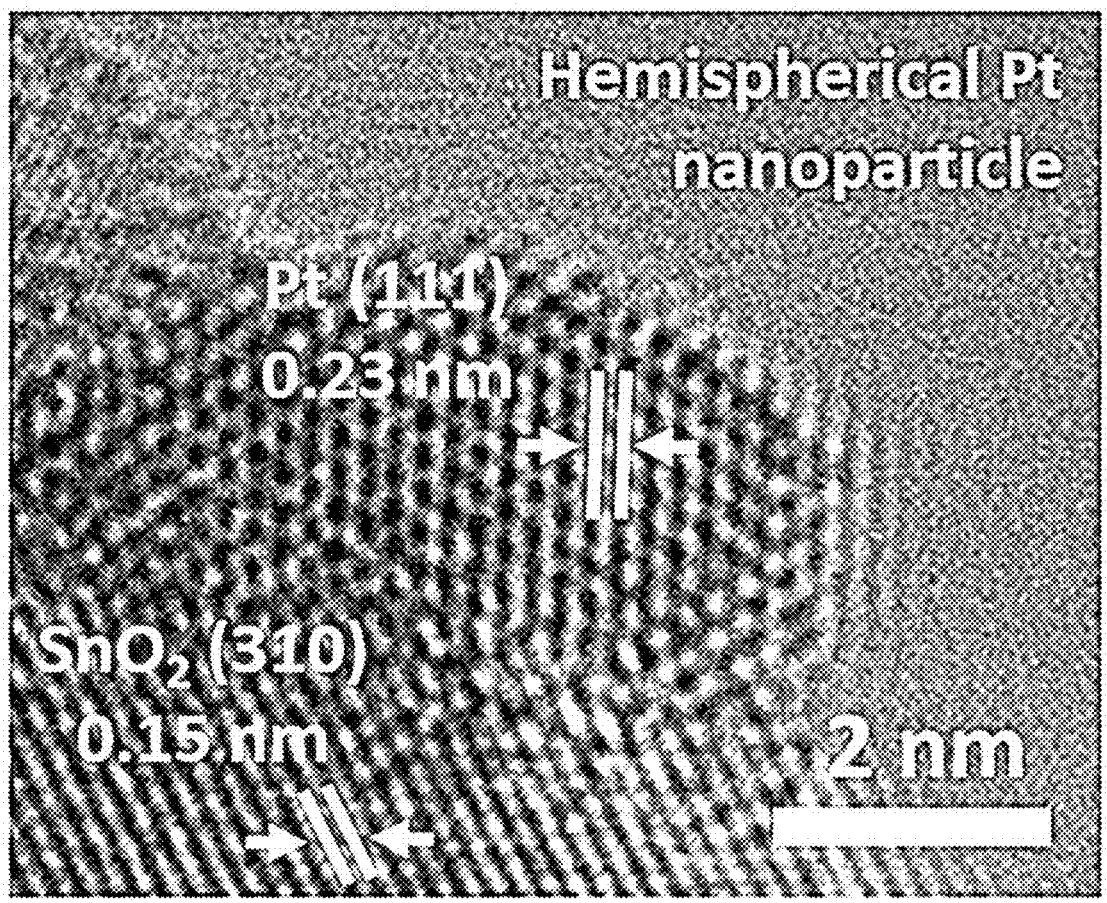
FIG. 12 is a diagram showing a TEM image of a three-dimensional fluorine-doped tin oxide nanotube support-based platinum catalyst (Pt/F:SnO$_2$) prepared in one embodiment of the present disclosure.
Figure 13:
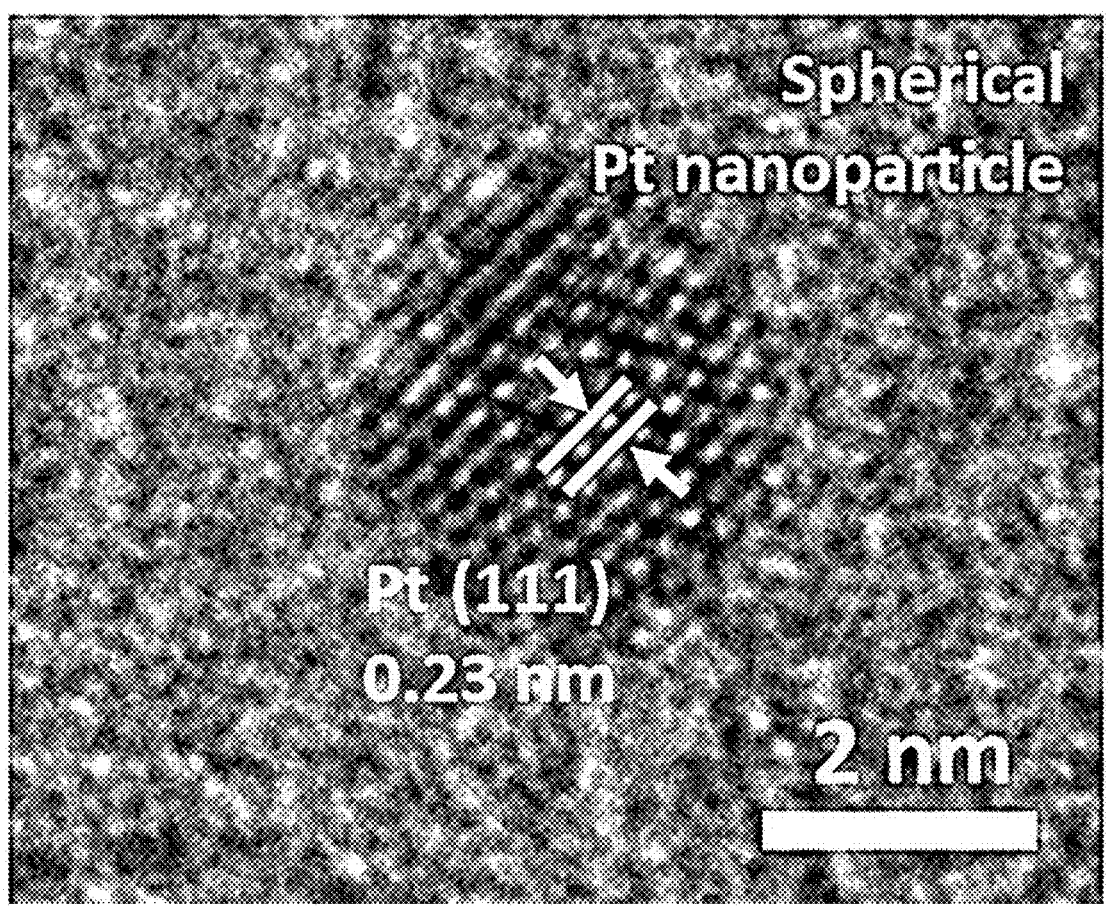
FIG. 13 is a diagram showing a TEM image of a commercially available catalyst Pt/C platinum particle of the comparative example of the present disclosure.
Figure 14:
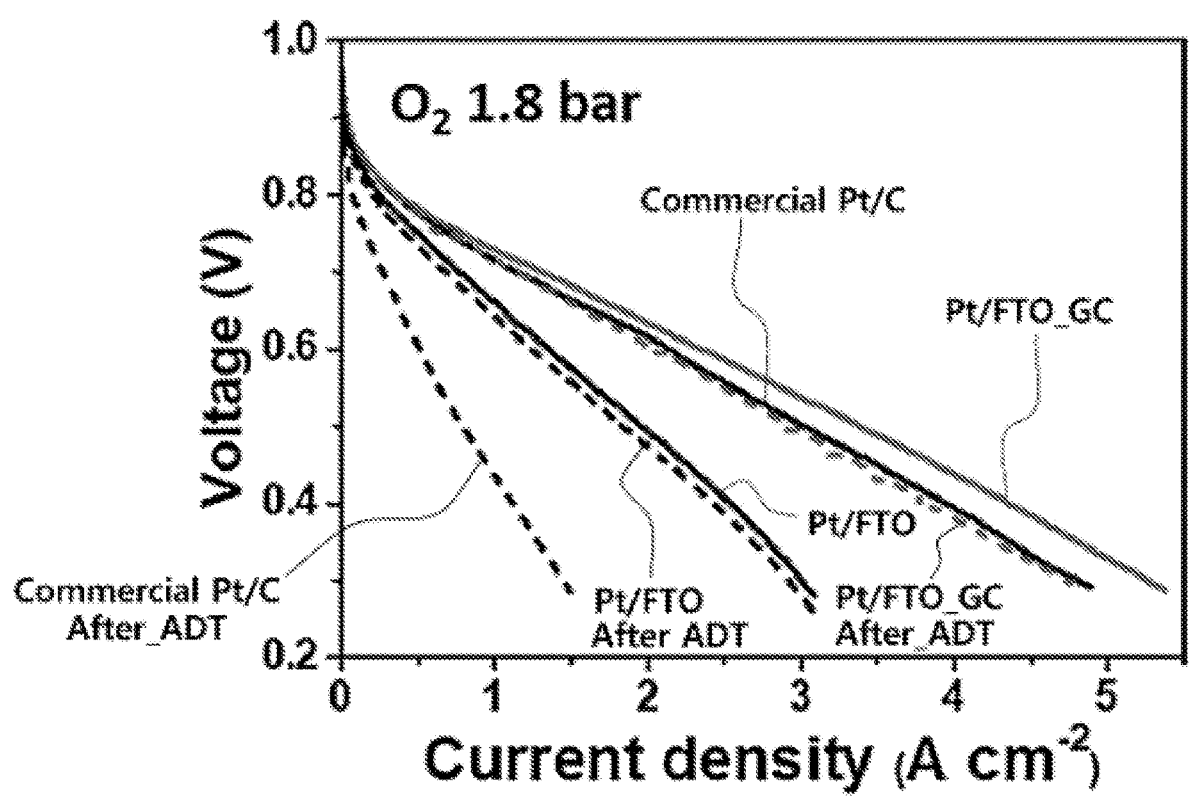
FIG. 14 is a diagram showing a performance curve before and after an end cell degradation test under oxygen conditions of a three-dimensional fluorine-doped tin oxide nanotube support-based platinum catalyst (Pt/FTO), a platinum catalyst which is added graphitic carbon as an additive (Pt/FTO GC), and a commercially available catalyst (Commercial Pt/C) prepared in one embodiment of the present disclosure.
Figure 15:
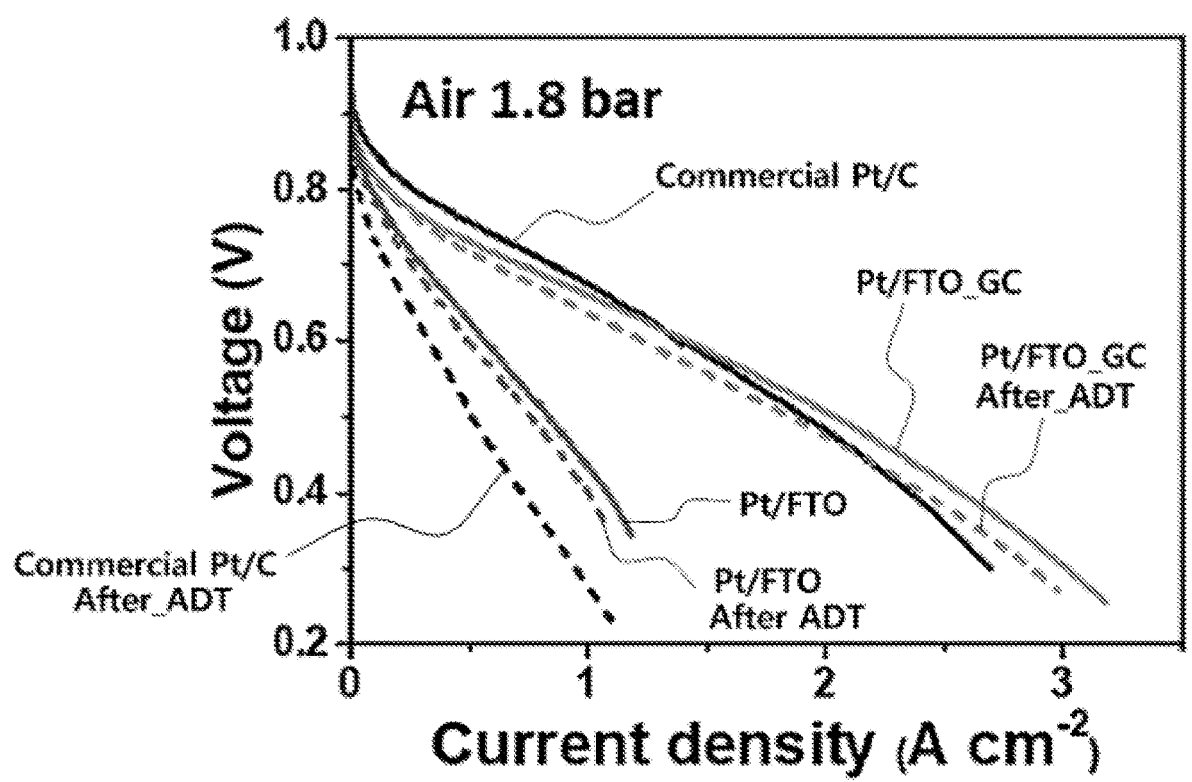
FIG. 15 is a diagram showing a performance curve before and after an end cell degradation test under air conditions of a three-dimensional fluorine-doped tin oxide nanotube support-based platinum catalyst (Pt/FTO), a platinum catalyst which is added graphitic carbon as an additive to the Pt/FTO (Pt/FTO GC), and a commercially available catalyst (Commercial Pt/C) prepared in one embodiment of the present disclosure.
Figure 16:
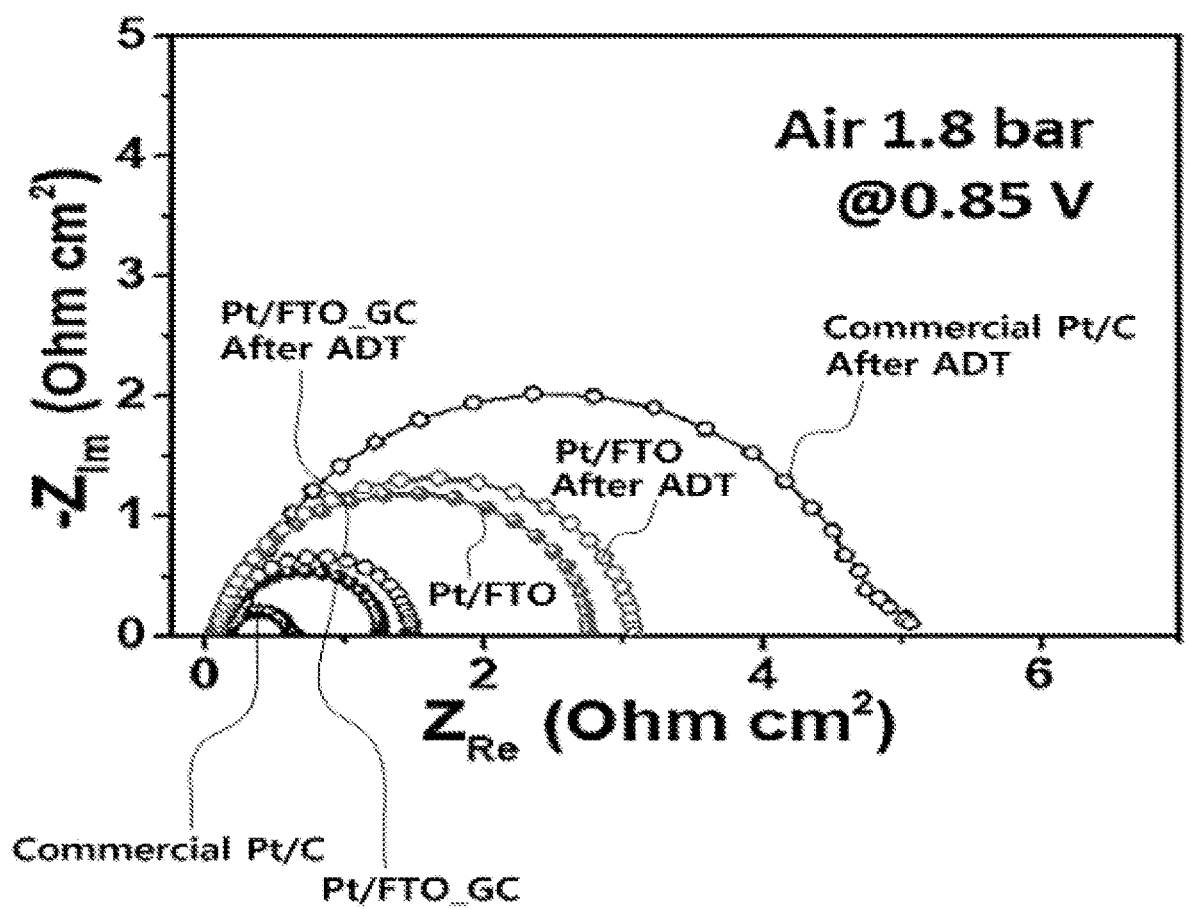
FIG. 16 is a diagram showing electrochemical impedance spectroscopy (EIS) of a three-dimensional fluorine-doped tin oxide nanotube support-based platinum catalyst (Pt/FTO), a platinum catalyst which is added graphitic carbon as an additive Pt/FTO (Pt/FTO GC), and a commercially available catalyst (Commercial Pt/C) prepared in one embodiment of the present disclosure.
Figure 17:
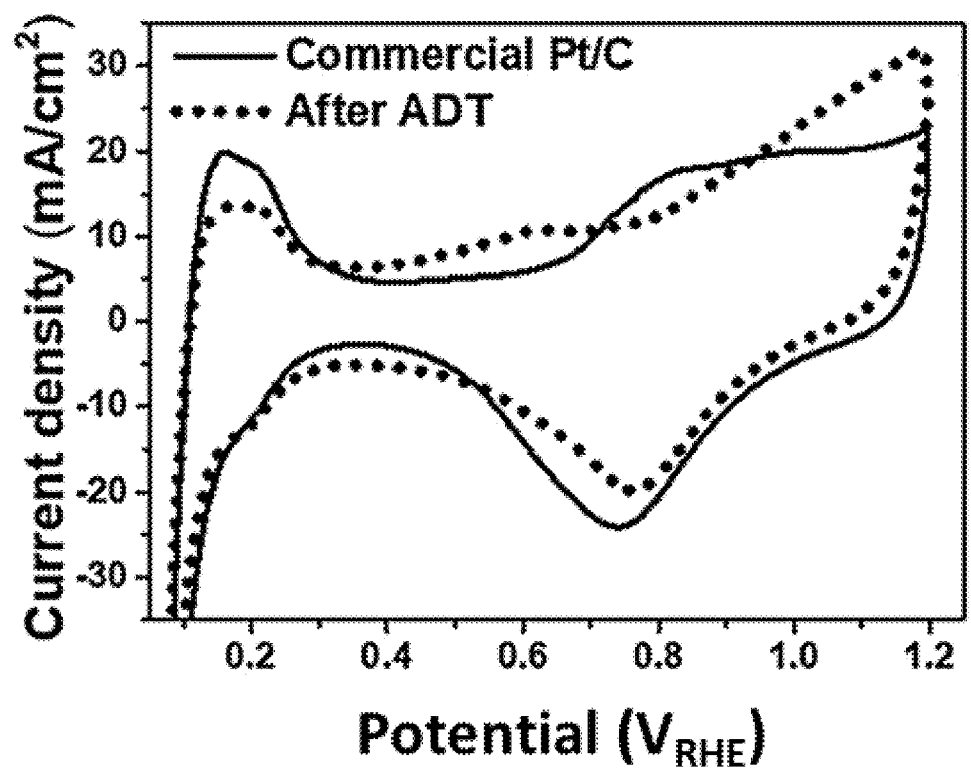
FIG. 17 is a diagram showing a cyclic voltammetry (CV) curve of a commercially available catalyst (commercial Pt/C) of the comparative example of the present disclosure.
Figure 18:
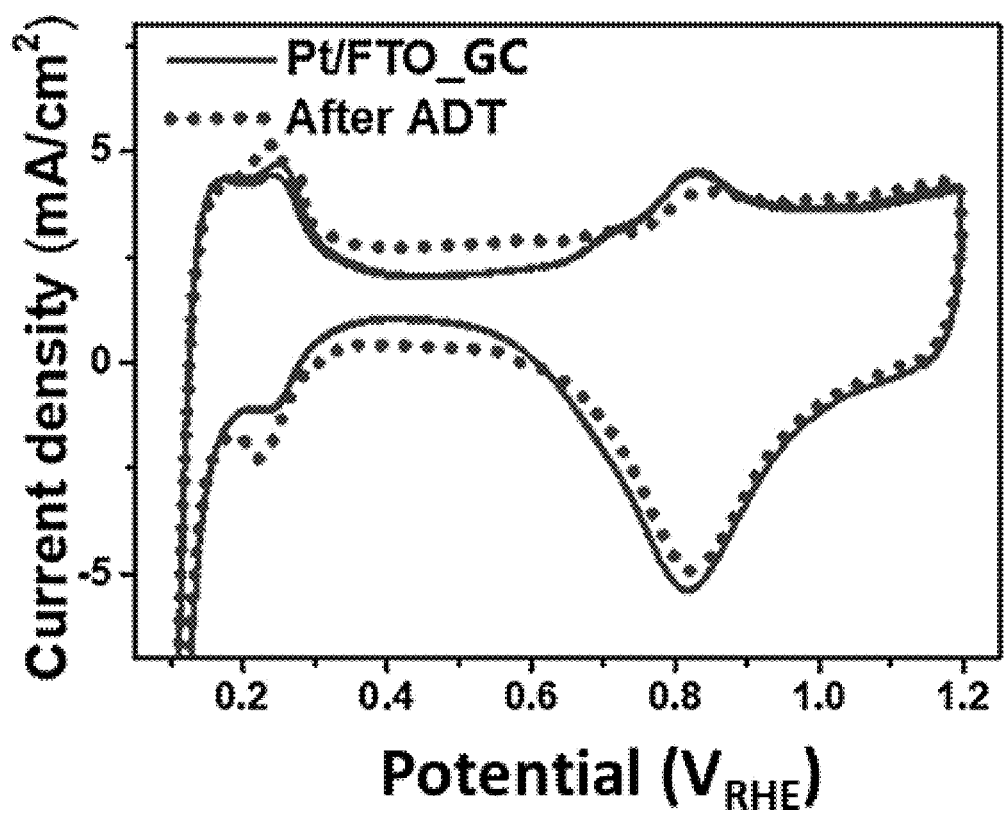
FIG. 18 is a diagram showing a cyclic voltammetry (CV) curve of a platinum catalyst which is added graphitic carbon as an additive to the Pt/FTO (Pt/FTO GC) prepared in one embodiment of the present disclosure.
Figure 19:
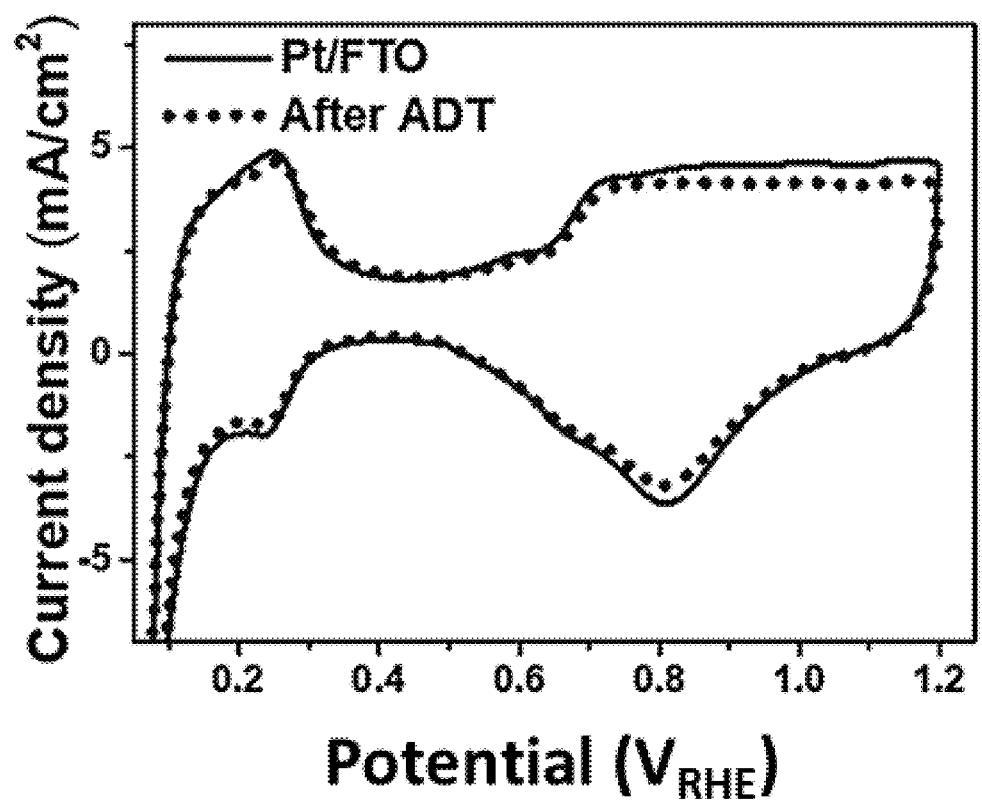
FIG. 19 is a diagram showing a cyclic voltammetry (CV) curve of a three-dimensional fluorine-doped tin oxide nanotube support-based platinum catalyst (Pt/FTO) prepared in one embodiment of the present disclosure.

As a result, the commercially available Pt/C catalyst (Comparative Example 4) of the comparative example maintained only 11.8% of the electrochemical surface area (ECSA) after 6000 cycles compared to the initial stage. Meanwhile, the platinum/fluorine-doped tin oxide nanotubes (Pt/F—SnO$_2$) (Example 2), which is one example of the present disclosure, showed excellent durability results in which ECSA was maintained 67% even after 6000 cycles compared to the initial stage (see FIGS. 6 to 8). As a result of mass activity analysis, the commercially available Pt/C catalyst (Comparative Example 4) of the comparative example decreased from the initial 18 A/g to 0.45 A/g after 6000 cycles, whereas the platinum/fluorine-doped tin oxide nanotubes (Example 2) in one example of the present disclosure showed a very small decrease in mass activity from 27 A/g to 17 A/g after 6000 cycles, and thus it was found that it shows very good durability (see FIG. 9). FIG. 10 is a graph showing cyclic voltammetry (CV) characteristics of the commercially available Pt/C catalysts (Comparative Example 4) of the comparative example and platinum/fluorine-doped tin oxide nanotubes (Example 2) of one example of the present disclosure. In the case of the present disclosure, it was found that the platinum reduction peak is moved in the positive direction in the CV due to the strong interaction between the platinum and the support. This means that the present disclosure will have improved oxidation reduction activity as compared to commercially available Pt/C catalysts. In reality, as shown in FIG. 11, the platinum/fluorine-doped tin oxide nanotubes (Example 2) of one example of the present disclosure showed about 61% improvement in initial activity per mass of the platinum catalyst over the commercially available Pt/C catalyst (Comparative Example 4) of the comparative example. This is because in the present disclosure, a compressive strain in the platinum lattice is induced to reduce the oxygen adsorption energy, which soon leads to an improvement in the catalytic activity. FIGS. 12 and 13 are diagrams showing a TEM crystal image of the platinum nanoparticles in a commercially available Pt/C catalyst (Comparative Example 4) (FIG. 13) of the comparative example and the platinum/fluorine-doped tin oxide nanotubes (Example 2) (FIG. 12) of one example of the present disclosure. The interplanar distance of the Pt (111) plane of platinum in Example 2 (Pt/F:SnO$_2$) of the present disclosure and the interplanar distance of the Pt (111) plane of platinum in Comparative Example 4 (Pt/C) were all 0.23 nm. However, in the present disclosure, the platinum nanoparticles are synthesized on the fluorine-doped tin-based oxide, and compressive deformation occurs in the platinum lattice, and thus is found to have a hemispherical Pt nanoparticle as shown in FIG. 12. Oxide supports are known to have strong interactions with platinum, in which case they are synthesized in hemispherical form when platinum nanoparticles are formed and induce compressive deformation in the lattice. When compressive deformation occurs in the platinum nanoparticle lattice, deformation of the platinum electron band occurs, which lowers the d-orbital center and reduces oxygen adsorption energy, thus improving oxygen reduction reaction characteristics.

TEST EXAMPLE 3

The following experiment was carried out to analyze the electrochemical durability of the platinum catalyst supported on the fluorine-doped tin oxide nanotube support (Pt/FTO) (Example 2) of one example of the present disclosure and the platinum catalyst in which graphitic carbon is further added to Example 2 above (Pt/FTO GC) (Example 3). In the same manner as Test Example 2 above, as a comparative example, a commercially available platinum/carbon (Pt/C) catalyst (manufacturer: Tanaka, product name: Pt/C (Pt 46.2 wt %)) was used (Comparative Example 4).

First, a slurry was prepared by dispersing each platinum catalyst in an isopropyl alcohol solution together with a Nafion fluorinated resin solution (5% by weight) (manufacturer: Sigma-aldrich), which is an ionomer. Then, the electrode was prepared by spray coating the slurry on a Nafion 211™ (25 μm) membrane of Du Pont Co. as a polymer electrolyte. In the case of Example 3 above, as an additive in preparing the slurry, graphitic carbon (manufacturer: RTX, product name: graphitic carbon black) was further added in an amount of 10% by weight based on the total weight of the catalyst of Example 2 and was dispersed in a slurry solution for preparation.

When fabricating a membrane electrode assembly (MEA), the anodes were all loaded with 0.2 mg/cm$^2$ of commercially available Pt/C (Pt 46.2 wt %). At the cathode, the loading amount of the platinum catalyst of Comparative Example 4 (Pt/C, Pt 46.2 wt %), Example 2 (Pt 30 wt %) and Example 3 (Pt 30 wt %+C 10 wt %) were fixed at 0.4 mg/cm$^2$, respectively.

The anode was purged with 200 sccm of H$_2$ and the cathode was purged with 600 sccm of N$_2$. After lowering the open circuit voltage (OCV) to 0.14 V or less, the voltage sweep was proceeded with 5,000 cycles of 1.0-1.5 V and 100 mV/s scan speed using cyclic voltammetry.

Figure 20:
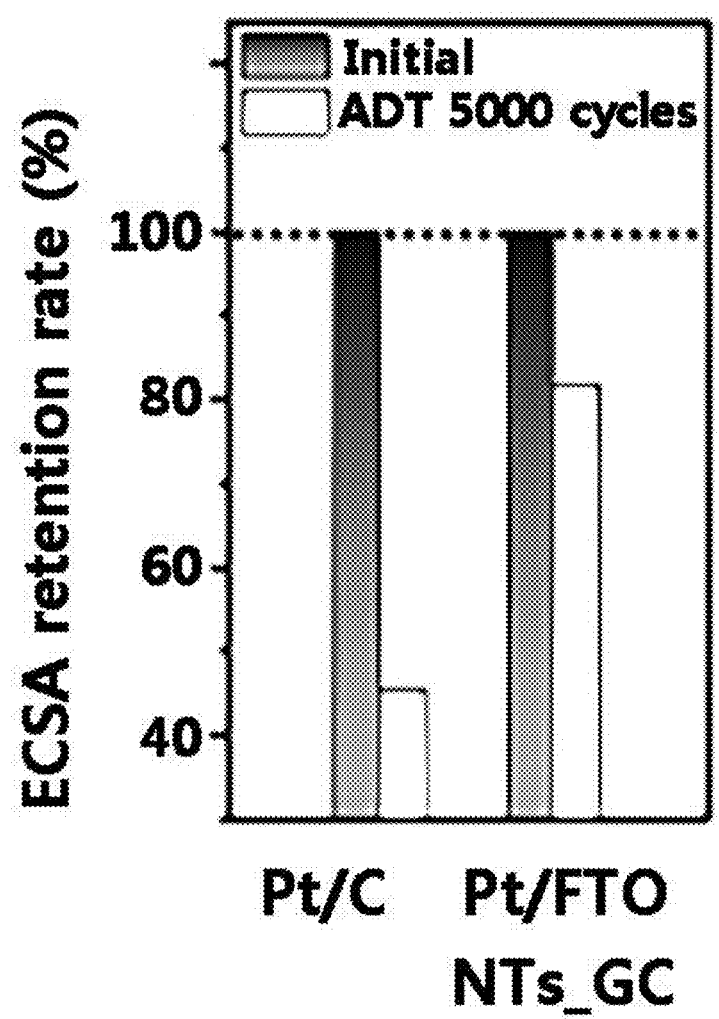
FIG. 20 is a diagram showing an electrochemically active surface area (ECSA) change graphs of a commercially available platinum/carbon catalyst (Commercial Pt/C) of the comparative example of the present disclosure and Example 3 which is further added graphitic carbon as an additive, prepared in one embodiment of the present disclosure.

FIGS. 14 to 19 show polymer electrolyte fuel cell I-V measurement results (FIGS. 14 and 15), EIS (Electrochemical impedance spectroscopy) (FIG. 16), and CV curves (FIGS. 17 to 19) before and after the degradation test (ADT) of a commercially available platinum/carbon catalyst (Pt/C) of Comparative Example 4 above, a platinum catalyst (Pt/FTO) in which platinum is supported on a fluorine-doped tin oxide nanotube support of Example 2, and Example 3 (Pt/FTO GC), in which graphitic carbon was further added in Example 2. As a result, in the case of Comparative Example 4 (Commercial Pt/C), the maximum power density was decreased by 71.5% under oxygen condition and 69.7% under air condition after the degradation test, while in Example 2 (Pt/FTO), the maximum power density was decreased by 11.6% under oxygen condition and 7.8% under air condition. In the case of Example 3 (Pt/FTO GC), the maximum power density was decreased by 4.7% under oxygen condition and 7.0% under air condition, indicating that the corrosion resistance after the degradation test was greatly improved (see FIGS. 14 and 15). The EIS curve shows the change of resistance component of the catalyst layer before and after degradation. In the case of Example 2 (Pt/FTO) and Example 3 (Pt/FTO GC), the resistance increased slightly in the initial semicircle. However, Comparative Example 4 (Commercial Pt/C) showed the result of more than five times increase in resistance before and after degradation. Thus, it was further found that the FTO-based catalyst layer has greatly improved resistance to degradation (see FIG. 16). The commercially available platinum/carbon catalyst (Commercial Pt/C) of Comparative Example 4 had a reduction ratio of catalyst ECSA of 55% compared to the initial stage (see FIG. 17), whereas the platinum catalyst (Pt/FTO) of Example 2 had an ECSA reduction ratio of 2%. Thus, it was found that it has an improved electrochemical corrosion resistance (see FIG. 19). The platinum catalyst (Pt/FTO GC) of Example 3, which is further added with graphitic carbon as an additive, showed an ECSA reduction ratio of 20% (see FIG. 18). In the case of the catalyst surface area, as shown in FIG. 20, the commercially available platinum/carbon catalyst (Commercial Pt/C) was maintained only by 45% after degradation, whereas the platinum catalyst (Pt/FTO NTs_GC) of Example 3 was maintained by 81%.

The present disclosure may provide the following embodiments as an example.

In a first embodiment, there may be provided a fluorine-doped tin oxide support.

In a second embodiment, in accordance with the first embodiment, there may be provided a tin oxide support, wherein the tin oxide support is in the form of nanotubes, nanofibers, nanoparticles, or microparticles.

In a third embodiment, in accordance with any one or more of the first and second embodiments, there may be provided a tin oxide support, wherein the fluorine is doped at 5 to 10 at % based on the total number of atoms of the support.

In a fourth embodiment, in accordance with any one or more of the first to third embodiments, there may be provided a platinum catalyst for a fuel cell comprising a platinum nanoparticle, and the tin-based oxide support doped with the fluorine.

In a fifth embodiment, in accordance with any one or more of the first to fourth embodiments, there may be provided a platinum catalyst for a fuel cell, wherein the tin oxide support is a tin oxide nanotube support.

In a sixth embodiment, in accordance with any one or more of the first to fifth embodiments, there may be provided a platinum catalyst for a fuel cell, wherein the platinum nanoparticles are comprised in an amount of 30% to 50% by weight based on the total weight of the catalyst.

In a seventh embodiment, in accordance with any one or more of the first to sixth embodiments, there may be provided a platinum catalyst for a fuel cell, wherein an average particle diameter of the platinum nanoparticles is 2 nm to 5 nm.

In an eighth embodiment, in accordance with any one or more of the first to seventh embodiments, there may be provided a platinum catalyst for a fuel cell, wherein the fluorine-doped tin oxide nanotube support is comprised in an amount of 50% to 70% by weight based on the total weight of the catalyst.

In a ninth embodiment, in accordance with any one or more of the first to eighth embodiments, there may be provided an oxidation reduction electrode for a fuel cell comprising the platinum catalyst.

In a tenth embodiment, in accordance with any one or more of the first to ninth embodiments, there may be provided an oxidation reduction electrode for a fuel cell further comprising one or more selected from graphitic carbon, carbon nanotubes, and graphene as an additive.

In an eleventh embodiment, in accordance with any one or more of the first to tenth embodiments, there may be provided an oxidation reduction electrode for a fuel cell, wherein the additive is comprised in an amount of 5% to 15% by weight based on the total weight of the catalyst.

In a twelfth embodiment, in accordance with any one or more of the first to eleventh embodiments, there may be provided a fuel cell comprising the platinum catalyst.

In a thirteenth embodiment, in accordance with any one or more of the first to twelfth embodiments, there may be provided a method for producing a fluorine-doped tin oxide support, comprising electrospinning a solution comprising a tin precursor and a fluorine precursor to produce a tin oxide nanofiber doped with fluorine, and heat-treating the nanofiber to produce a nanotube.

In a fourteenth embodiment, in accordance with any one or more of the first to thirteenth embodiments, there may be provided a production method, wherein the producing of the nanofibers comprises adding 5% to 17% by weight of the tin precursor based on the total weight of the solvent and 10% to 23% by weight of the nanotube template material based on the total weight of the solvent to the spinning solvent, and adding and mixing 5% to 40 mol % of a fluorine precursor.

In a fifteenth embodiment, in accordance with any one or more of the first to fourteenth embodiments, there may be provided a production method, wherein the producing of the nanofibers comprises injecting a solution comprising the tin precursor and the fluorine precursor at 0.3 ml/h to 0.7 ml/h while applying a voltage of 17 kV to 20 kV to spin the solution.

In a sixteenth embodiment, in accordance with any one or more of the first to fifteenth embodiments, there may be provided a production method, wherein the heat treatment of the nanofibers comprises heat treatment at 500° C. to 700° C. for 1 to 3 hours in an oxygen or air atmosphere.

In a seventeenth embodiment, in accordance with any one or more of the first to sixteenth embodiments, there may be provided a production method, wherein the heat treatment of the nanofibers removes the nanotube template material.

In an eighteenth embodiment, in accordance with any one or more of the first to seventeenth embodiments, there may be provided a production method, wherein the tin precursor comprises one or more selected from the group consisting of tin (II) chloride ($SnCl_2$), tin (II) chloride dehydrate ($SnCl_2 2H_2O$), tin (IV) chloride pentahydrate ($SnCl_{2.2}5H_2O$), hexamethylditin (($CH_3)_3SnSn(CH_3)_3$), trimethyltin chloride (($CH_3)_3SnCl$), tributylchlorotin ($[CH_3(CH_2)_3]_3SnCl$), and tributyltin chloride ($[CH_3(CH_2)_3]_3SnCl$).

In a nineteenth embodiment, in accordance with any one or more of the first to eighteenth embodiments, there may be provided a production method, wherein the fluorine precursor comprises ammonium fluoride ($NH_4F$).

In a twentieth embodiment, in accordance with any one or more of the first to nineteenth embodiments, there may be provided a production method, wherein the nanotube template material comprises one or more selected from the group consisting of polyvinylpyrrolidone (PVP), polyvinylidene fluoride (PVdF), polyamides (Nylon), and polyurethane (PU), polyvinyl alcohol (PVA), polysulfone (PSU), polyethylene oxide (PEO), polyacrylonitrile (PAN), polybenzimidazole (PBI), polyaniline (PA), polyimide (PI), polystyrene (PS), polyvinyl chloride (PVC), cellulose acetate, chitosan, silk, collagen, poly-gamma-glutamic acid (PGA), poly lactic acid (PLA), and polycaprolactone (PCL).

In a twenty-first embodiment, in accordance with any one or more of the first to twentieth embodiments, there may be provided a method for producing a platinum catalyst for a fuel cell, wherein the method comprises supporting platinum nanoparticles on a fluorine-doped tin oxide support.

In a twenty-second embodiment, in accordance with any one or more of the first to twenty-first embodiments, there may be provided a method for producing a platinum catalyst for a fuel cell, further comprising a fluorine-doped tin oxide support according to the production method above.

In a twenty-third embodiment, in accordance with any one or more of the first to twenty-second embodiments, there may be provided a production method, wherein the platinum nanoparticles are supported in an amount of 30% to 50% by weight based on the total weight of the catalyst.

In a twenty-fourth embodiment, in accordance with any one or more of the first to twenty-third embodiments, there may be provided a production method, wherein the supporting of the platinum nanoparticles on the fluorine-doped tin oxide support comprises preparing a solution in which the fluorine-doped tin oxide support is dispersed, putting a platinum precursor into the dispersed solution and mixing the mixture, putting a reducing agent into the mixed solution to perform a reduction reaction, and collecting the powder by filtering the solution after reduction reaction and heat treating the collected powder to obtain a fluorine-doped tin oxide on which platinum nanoparticles are supported.

In a twenty-fifth embodiment, in accordance with any one or more of the first to twenty-fourth embodiments, there may be provided a production method, wherein the platinum precursor comprises one or more selected from the group consisting of platinum (IV) chloride ($PtCl_4$), hydrogen hexahydroxyplatinate ($H_2Pt(OH)_6$), chloroplatinic acid hydrate (($PtCl_6$) $(H_2O)_x$ ($0=x\leq6$)), and platinum acetylacetonate ($Pt(CH_3COCHCOCH_3)_2$)).

In a twenty-sixth embodiment, in accordance with any one or more of the first to twenty-fifth embodiments, there may be provided a production method, wherein the preparing of the solution in which the fluorine-doped tin oxide support is dispersed further comprises, further adding a surfactant comprising one or more selected from the group consisting of sodium acetate ($C_2H_3NaO_2$), tetraoctylammonium bromide ($[CH_3(CH_2)_7]_4N(Br)$), and oleylamine ($CH_3(CH_2)_7CH=CH(CH_2)_7CH_2NH_2$) to the solution, or adjusting pH to 10 or more by adding a potassium hydroxide solution to the solution.

In one aspect, the present disclosure is directed to providing a tin oxide doped with fluorine by means of electrospinning, thereby solving a deterioration issue of the existing carbon support, while minimizing electrochemical elution of dopant or tin, which is a limitation of the tin oxide support itself, so that it is excellent in performance and durability as a catalyst for a fuel cell. In the case of the platinum particles synthesized on the tin oxide nanotube support of an embodiment of the present disclosure, compressive deformation occurs in the lattice due to strong mutual attraction between the tin oxide support and the platinum particles, resulting in weak adsorption strength with oxygen species, which eventually show more improved catalytic properties. In addition, since the catalyst support of an embodiment of the present disclosure has excellent electrochemical stability, it can also be used in various electrochemical catalysts such as various water electrolytic catalysts, carbon dioxide catalysts, and catalysts for lithium air batteries, in addition to fuel cell platinum catalysts.

While the present disclosure has been described with respect to the specific embodiments, it will be apparent to those skilled in the art that various changes and modifications may be made without departing from the spirit and scope of the invention as defined in the following claims.

What is claimed is:

1. A method for producing a platinum catalyst for a fuel cell, the method comprising:
    (a) producing of a solution comprising a tin precursor and a fluorine precursor by comprising:
       adding 5% to 17% by weight of the tin precursor based on the total weight of a spinning solvent and 10% to 23% by weight of a nanotube template material based on the total weight of the spinning solvent; and
       adding 5% to 40 mol % of a fluorine precursor based on a total number of moles of the spinning solvent;
    (b) producing a fluorine-doped tin oxide nanofibers support by electrospinning the solution comprising the tin precursor and the fluorine precursor while injecting the solution at 0.3 ml/h to 0.7 ml/h and applying a voltage of 17 kV to 20 kV;
    (c) heat-treating the fluorine-doped tin oxide nanofibers support at 500° C. to 700° C. for 1 to 3 hours in an oxygen or air atmosphere to produce a nanotube, wherein the fluorine is doped at 5 to 8.5 at. % based on the total number of atoms of the fluorine-doped tin oxide nanofibers support; and
    (d) supporting platinum nanoparticles on the fluorine-doped tin oxide nanofibers support, and
    wherein the nanotube template material comprises one or more selected from the group consisting of polyvinylidene fluoride (PVdF), polyamides (Nylon), polyurethane (PU), polysulfone (PSU), polyacrylonitrile (PAN), polybenzimidazole (PBI), polyaniline (PA), polyimide (PI), polystyrene (PS), polyvinyl chloride (PVC), cellulose acetate, chitosan, silk, collagen, poly-gamma-glutamic acid (PGA), poly lactic acid (PLA), and polycaprolactone (PCL).

2. The method of claim 1, wherein the heat treatment of the fluorine-doped tin oxide nanofibers support removes the nanotube template material.

3. The method of claim 1, wherein the tin precursor comprises one or more selected from the group consisting of tin (II) chloride ($SnCl_2$), tin (II) chloride dihydrate ($SnCl_2 2H_2O$), tin (IV) chloride pentahydrate ($SnCl_2 5H_2O$), hexamethylditin (($CH_3$)$_3$SnSn($CH_3$)$_3$), trimethyltin chloride (($CH_3$)$_3$SnCl), tributylchlorotin ([$CH_3(CH_2)_3$]$_3$SnCl), and tributyltin chloride ([$CH_3(CH_2)_3$]$_3$SnCl).

4. The method of claim 1, wherein the fluorine precursor comprises ammonium fluoride ($NH_4F$).

5. The method of claim 1, wherein the nanotube template material comprises one or more selected from the group consisting of PVdF, Nylon, PU, PSU, PBI, PA, PI, PS, PVC, cellulose acetate, chitosan, collagen, PGA, PLA, and PCL.

6. The method of claim 1, wherein in step (c), wherein the fluorine is doped at 5.5 to 8.5 at. % based on the total number of atoms of the fluorine-doped tin oxide nanofibers support.

* * * * *